US012639087B2

(12) United States Patent
Proulx et al.

(10) Patent No.: US 12,639,087 B2
(45) Date of Patent: May 26, 2026

(54) SYSTEMS AND METHODS FOR PRESENTING INFORMATION TO AN OPERATOR OF A RECREATIONAL VEHICLE

(71) Applicant: BOMBARDIER RECREATIONAL PRODUCTS INC., Valcourt (CA)

(72) Inventors: Jean-Robert Proulx, St-Denis-de-Brompton (CA); Alain Massicotte, Bromont (CA); Martin Laliberte, Granby (CA); Keven Viens Messier, L'Avenir (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 142 days.

(21) Appl. No.: 18/687,202

(22) PCT Filed: Aug. 31, 2022

(86) PCT No.: PCT/IB2022/058186
§ 371 (c)(1),
(2) Date: Feb. 27, 2024

(87) PCT Pub. No.: WO2023/031830
PCT Pub. Date: Mar. 9, 2023

(65) Prior Publication Data
US 2024/0354127 A1      Oct. 24, 2024

Related U.S. Application Data
(60) Provisional application No. 63/239,146, filed on Aug. 31, 2021.

(51) Int. Cl.
*G06F 9/451* (2018.01)
*B62J 50/22* (2020.01)
(Continued)

(52) U.S. Cl.
CPC .............. *G06F 9/451* (2018.02); *B62J 50/22* (2020.02); *G06F 3/0482* (2013.01); *G06F 3/04847* (2013.01); *G06F 2203/04803* (2013.01)

(58) Field of Classification Search
CPC .... G06F 9/451; G06F 3/0482; G06F 3/04847; G06F 2203/04803; B62J 50/22;
(Continued)

(56) References Cited

U.S. PATENT DOCUMENTS 9,324,195 B2    4/2016  Koenig et al.
9,644,969 B2    5/2017  Koenig et al.
(Continued)

FOREIGN PATENT DOCUMENTS

DE    102009040255 A1      3/2011
DE    202012009024    *   9/2012
(Continued)

OTHER PUBLICATIONS

The Supplementary European Search Report issued during the prosecution of corresponding application No. 22863755.9, dated Jun. 16, 2025.

*Primary Examiner* — Alan D Hutchinson
(74) *Attorney, Agent, or Firm* — BCF LLP

(57) ABSTRACT

The disclosed systems and methods for presenting information to an operator of the recreational vehicle comprising i) displaying a first graphical user interface (GUI) component representing a first set of information, ii) upon receiving a first control command, displaying, a second GUI component comprising a third GUI component and a fourth GUI component, the third GUI component representing a first controllable functionality of the recreational vehicle, the fourth GUI component representing a first modifiable setting of the first controllable functionality of the recreational vehicle,
(Continued)

and iii) upon receiving a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality.

20 Claims, 20 Drawing Sheets

(51) Int. Cl.
*G06F 3/0482* (2013.01)
*G06F 3/04847* (2022.01)

(58) Field of Classification Search
CPC ........ B60K 2360/166; B60K 2360/167; B60K 2360/186; B60K 35/28; B60K 35/29; B60K 2360/782; B60K 35/10; B60W 50/082; B60W 50/10; B60W 30/182; B60W 50/085
See application file for complete search history.

(56) References Cited

U.S. PATENT DOCUMENTS

| | | | |
|---|---|---|---|
| 10,038,977 | B2 | 7/2018 | Rentz et al. |
| 10,203,220 | B2 | 2/2019 | Koenig et al. |
| 10,584,977 | B2 | 3/2020 | Koenig et al. |
| 10,595,160 | B2 | 3/2020 | Rentz et al. |
| 10,764,729 | B2 | 9/2020 | Wotton |
| 10,856,117 | B2 | 12/2020 | Puckette et al. |
| 2004/0122674 | A1 | 6/2004 | Bangalore et al. |
| 2012/0179325 | A1 | 7/2012 | Faenger |
| 2016/0041803 | A1 | 2/2016 | Markov et al. |
| 2016/0104486 | A1 | 4/2016 | Penilla et al. |
| 2017/0334500 | A1 | 11/2017 | Jarek et al. |
| 2018/0141543 | A1 | 5/2018 | Krosschell et al. |
| 2019/0016216 | A1 | 1/2019 | Sundberg et al. |
| 2019/0265064 | A1 | 8/2019 | Koenig et al. |
| 2020/0209012 | A1 | 7/2020 | Koenig et al. |
| 2020/0213807 | A1 | 7/2020 | Rentz et al. |
| 2020/0238824 | A1 | 7/2020 | Park |
| 2021/0039562 | A1 | 2/2021 | Jablonski et al. |

FOREIGN PATENT DOCUMENTS

| | | | | |
|---|---|---|---|---|
| DE | 102013021477 | A1 | 8/2014 | |
| DE | 102015004367 | A1 | 12/2015 | |
| EP | 3418101 | A1 | 12/2018 | |
| EP | 3418101 | B1 * | 7/2023 | ........... B60K 35/215 |

* cited by examiner

200

360

390

300

330

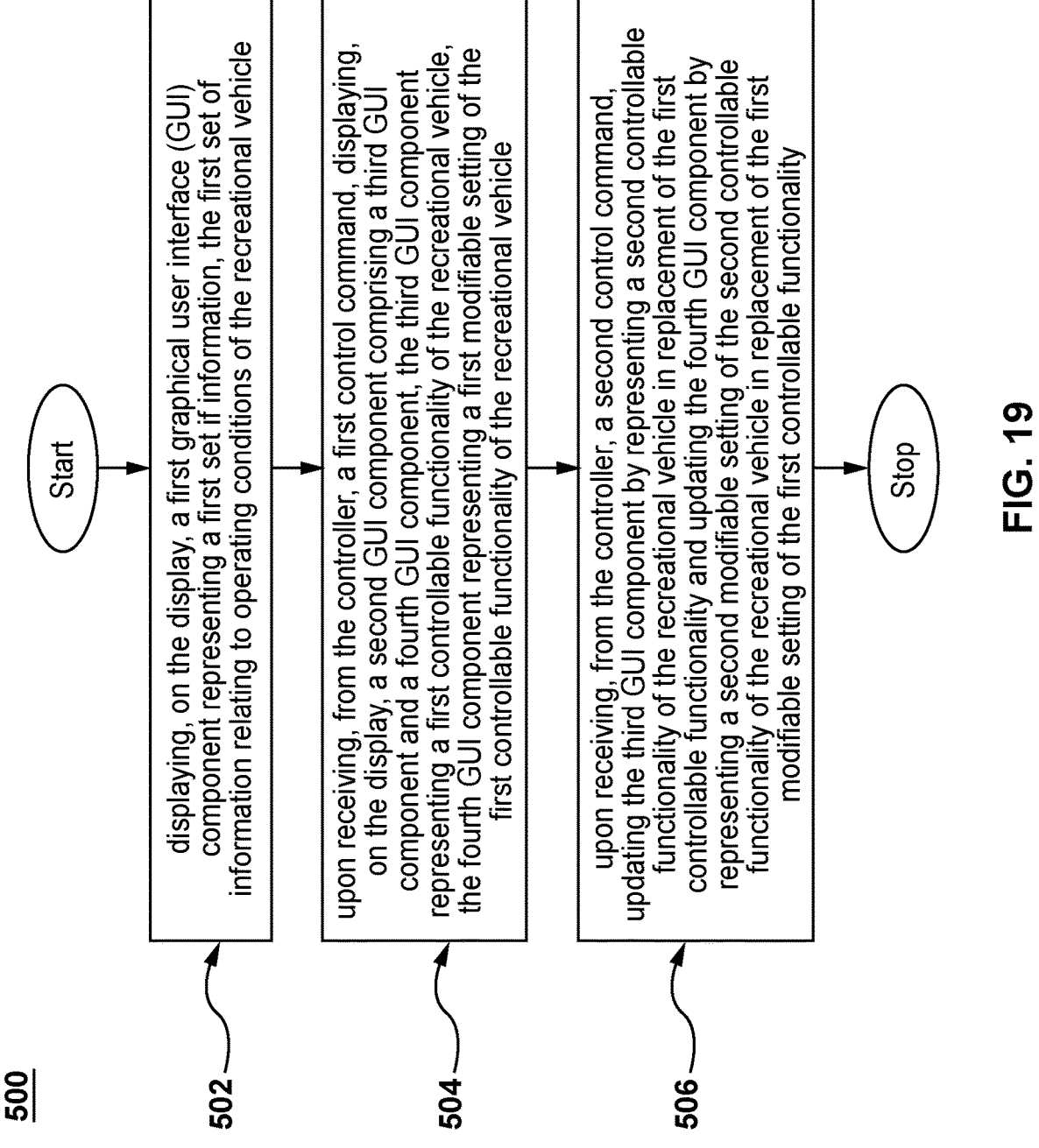

500

Start

502 — displaying, on the display, a first graphical user interface (GUI) component representing a first set if information, the first set of information relating to operating conditions of the recreational vehicle 504 — upon receiving, from the controller, a first control command, displaying, on the display, a second GUI component comprising a third GUI component and a fourth GUI component, the third GUI component representing a first controllable functionality of the recreational vehicle, the fourth GUI component representing a first modifiable setting of the first controllable functionality of the recreational vehicle 506 — upon receiving, from the controller, a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality Stop

FIG. 19

SYSTEMS AND METHODS FOR PRESENTING INFORMATION TO AN OPERATOR OF A RECREATIONAL VEHICLE

CROSS-REFERENCE

This application claims priority to U.S. Provisional Application No. 63/239,146, entitled "SYSTEMS AND METHODS FOR PRESENTING INFORMATION TO AN OPERATOR OF A RECREATIONAL VEHICLE", filed on Aug. 31, 2021, the entirety of which is incorporated herein by reference.

TECHNICAL FIELD

The present disclosure generally relates to recreational vehicles and, in particular, to a system and a method for controlling a recreational vehicle and/or presenting information to an operator of the recreational vehicle.

BACKGROUND

As digital displays have become more common, first alongside analog gauges and then often replacing them entirely, the variety of information that can be displayed to an operator of a vehicle has increased significantly. Non-analog screens (for example, older LCDs) allow the operator to customize their experience by enabling them to select which vehicle information should be displayed on the gauge and/or how that information should be displayed, for example allowing the operator to choose which information takes precedence (vehicle speed, RPM, coolant temperature, fuel level, or the like). More recent developments have allowed vehicle gauges to be connected to smartphones via software like Android Auto™, Apple CarPlay™ and Bosch MySpin™ to display "infotainment" content from applications running on the user's smartphone such as navigation applications, music streaming applications, weather applications or the like.

In addition, as vehicles are becoming more technically advanced, complex and sophisticated, there is a wider variety of vehicle functionalities that an operator can adjust during use of the vehicle to modify that vehicle's behavior. For examples many of the vehicles now allow the operator to select from multiple engine, suspension, steering and transmission "modes" (or combinations thereof). Selecting such a mode is often made possible via dedicated switches (corresponding to each mode) positioned on or around the handlebars or steering wheel. Modern vehicles also allow the display of various driving statistics. Other vehicle functions such as heated handlebar grips, adjustable windshields, vehicle mounted cameras, or the like can also have dedicated switches positioned on or around the handlebars or steering wheel.

Navigating between all these options, which include both native vehicle functions and external apps, via dedicated switches can be complicated, especially in the context of recreational vehicles that typically have less room for displays than in a conventional car. In addition, many recreational vehicles are steered via handlebars that, in contrast to a steering wheel, require both hands to remain on the handlebars during operation.

With this said, there is an interest in developing an efficient system for the recreational vehicles to navigate between various options.

SUMMARY

The embodiments of the present disclosure have been developed based on developers' appreciation of the limitations associated with the prior art, namely navigating through a wide variety of controllable functionalities of the recreational vehicle using dedicated switches.

In accordance with a first broad aspect of the present disclosure, there is provided a virtual cockpit system for a recreational vehicle, the virtual cockpit system comprising a display, a controller and a processor, the display being configured for presenting information to an operator of the recreational vehicle, the controller being configured for allowing interactions between the operator and the virtual cockpit system, the processor being configured for executing instructions which upon being executed cause: displaying, on the display, a first graphical user interface (GUI) component representing a first set of information, the first set of information relating to operating conditions of the recreational vehicle; upon receiving, from the controller, a first control command, displaying, on the display, a second GUI component comprising a third GUI component and a fourth GUI component, the third GUI component representing a first controllable functionality of the recreational vehicle, the fourth GUI component representing a first modifiable setting of the first controllable functionality of the recreational vehicle; and upon receiving, from the controller, a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality.

In accordance with any embodiments of the present disclosure, the second GUI component further comprises a fifth GUI component, the fifth GUI component representing an indicator of an active controllable functionality amongst a list of indicators representing a plurality of controllable functionalities.

In accordance with any embodiments of the present disclosure, receiving the second control command causes the indicator to be updated so as to reflect a change in the active controllable functionality.

In accordance with any embodiments of the present disclosure, the second GUI component defines a modal view temporarily displayed on the display.

In accordance with any embodiments of the present disclosure, the controller comprises ride settings and focus controllers and wherein the first and second control commands are received further to the operator interacting with the ride settings.

In accordance with any embodiments of the present disclosure, the ride settings are configured to allow the operator to circle from the first controllable functionality to the second controllable functionality.

In accordance with any embodiments of the present disclosure, the focus controllers are configured to allow the operator to modify the first modifiable setting if the first controllable functionality is active or the second modifiable setting if the second controllable functionality is active.

In accordance with any embodiments of the present disclosure, the first and/or the second controllable functionality are customizable by the operator.

In accordance with any embodiments of the present disclosure, the first and/or the second controllable functionality are associated with a sub-system of the recreational vehicle or an accessory associated with the recreational vehicle.

In accordance with any embodiments of the present disclosure, updating the third GUI component by representing the second controllable functionality in replacement of the first controllable functionality defines cycling through a carousel of possible actions for the operator.

In accordance with any embodiments of the present disclosure, the second GUI component is located adjacent to the first GUI component, the first GUI component extending horizontally from a left side of the display to a right side of the display, the second GUI component extending vertically from a top of the display to a bottom of the display, a width of the first GUI component being greater than a length of the first GUI component, a width of the second GUI component being smaller than a length of the second GUI component.

In accordance with any embodiments of the present disclosure, the instructions, upon being executed by the processor, further cause displaying, on the display, a sixth GUI component representing a second set of information, the second set of information relating to infotainment functionalities associated with the recreational vehicle.

In accordance with any embodiments of the present disclosure, the second GUI component is located between the first GUI component and the sixth GUI component.

In accordance with a second broad aspect of the present disclosure, there is provided a recreational vehicle comprising a virtual cockpit system for a recreational vehicle, the virtual cockpit system comprising a display, a controller and a processor, the display being configured for presenting information to an operator of the recreational vehicle, the controller being configured for allowing interactions between the operator and the virtual cockpit system, the processor being configured for executing instructions which upon being executed cause: displaying, on the display, a first graphical user interface (GUI) component representing a first set of information, the first set of information relating to operating conditions of the recreational vehicle; upon receiving, from the controller, a first control command, displaying, on the display, a second GUI component comprising a third GUI component and a fourth GUI component, the third GUI component representing a first controllable functionality of the recreational vehicle, the fourth GUI component representing a first modifiable setting of the first controllable functionality of the recreational vehicle; and upon receiving, from the controller, a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality.

In accordance with any embodiments of the present disclosure, the second GUI component further comprises a fifth GUI component, the fifth GUI component representing an indicator of an active controllable functionality amongst a list of indicators representing a plurality of controllable functionalities.

In accordance with any embodiments of the present disclosure, receiving the second control command causes the indicator to be updated so as to reflect a change in the active controllable functionality.

In accordance with any embodiments of the present disclosure, the second GUI component defines a modal view temporarily displayed on the display.

In accordance with any embodiments of the present disclosure, the controller comprises ride settings and focus controllers and wherein the first and second control commands are received further to the operator interacting with the ride settings.

In accordance with any embodiments of the present disclosure, the ride settings are configured to allow the operator to circle from the first controllable functionality to the second controllable functionality.

In accordance with any embodiments of the present disclosure further comprises a handlebar and the ride settings and the focus controllers are mounted on the handlebar In accordance with any embodiments of the present disclosure, further comprises a steering wheel and the ride settings and the focus controllers are mounted on the steering wheel.

In accordance with any embodiments of the present disclosure, the focus controllers are configured to allow the operator to modify the first modifiable setting if the first controllable functionality is active or the second modifiable setting if the second controllable functionality is active.

In accordance with any embodiments of the present disclosure, the first and/or the second controllable functionality are customizable by the operator.

In accordance with any embodiments of the present disclosure, the first and/or the second controllable functionality are associated with a sub-system of the recreational vehicle or an accessory associated with the recreational vehicle.

In accordance with any embodiments of the present disclosure, updating the third GUI component by representing the second controllable functionality in replacement of the first controllable functionality defines cycling through a carousel of possible actions for the operator.

In accordance with any embodiments of the present disclosure, the second GUI component is located adjacent to the first GUI component, the first GUI component extending horizontally from a left side of the display to a right side of the display, the second GUI component extending vertically from a top of the display to a bottom of the display, a width of the first GUI component being greater than a length of the first GUI component, a width of the second GUI component being smaller than a length of the second GUI component.

In accordance with any embodiments of the present disclosure, the instructions, upon being executed by the processor, further cause displaying, on the display, a sixth GUI component representing a second set of information, the second set of information relating to infotainment functionalities associated with the recreational vehicle.

In accordance with any embodiments of the present disclosure, the second GUI component is located between the first GUI component and the sixth GUI component.

In accordance with a third broad aspect of the present disclosure, there is provided a computer-implemented method for presenting information to an operator of a recreational vehicle comprising: displaying, on a display, a first graphical user interface (GUI) component representing a first set of information, the first set of information relating to operating conditions of the recreational vehicle; upon receiving, from a controller, a first control command, displaying, on the display, a second GUI component comprising a third GUI component and a fourth GUI component, the third GUI component representing a first controllable functionality of the recreational vehicle, the fourth GUI component representing a first modifiable setting of the first controllable functionality of the recreational vehicle; and upon receiving, from the controller, a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality.

BRIEF DESCRIPTION OF THE FIGURES

Further features and advantages of the present disclosure will become apparent from the following detailed description, taken in combination with the appended drawings, in which:

FIG. 19 depicts a flowchart of a process representing a method for presenting information to an operator of the vehicle, in accordance with various non-limiting embodiments of the present disclosure.

Figure 1:
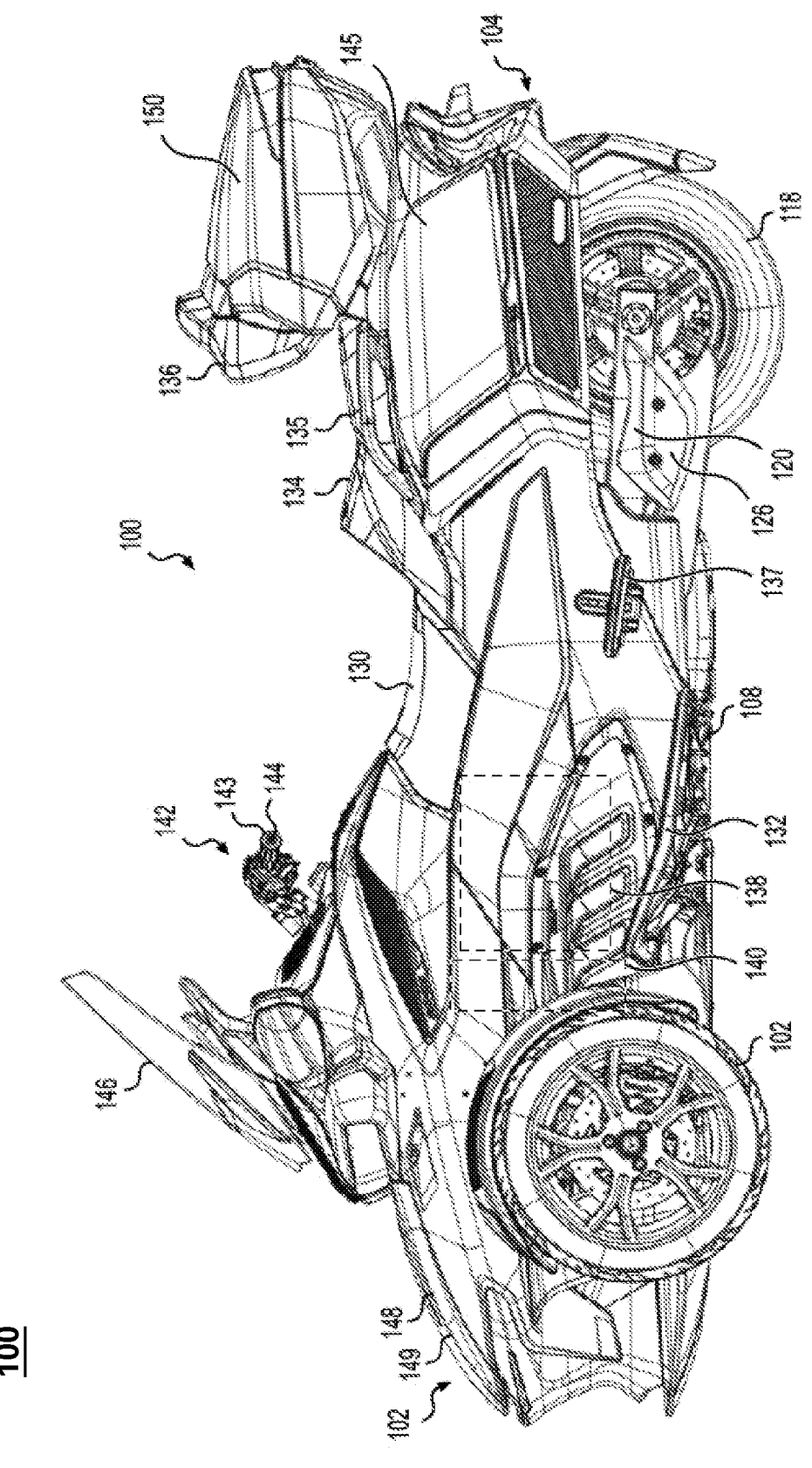
FIG. 1 illustrates a left side elevation view of a vehicle, in accordance with various non-limiting embodiments of present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for presenting information to an operator of the recreational vehicle.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first graphic user interface (GUI) component" and "third GUI component" is not intended to imply any particular order, type, chronology, hierarchy or ranking (for example) of/between the GUI components, nor is their use (by itself) intended to imply that any "second GUI component" must necessarily exist in any given situation. Further, as is discussed herein in other contexts, reference to a "first" element and a "second" element does not preclude the two elements from being the same actual real-world element.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for presenting information to an operator of the recreational vehicle.

The present technology will be described herein with respect to a three-wheeled straddle-type vehicle 100. It is contemplated that the present technology could also be implemented with vehicles that have two, four, or more wheels, as well as with other types of vehicles including, but not limited to, snowmobiles and personal watercraft.

With reference to FIG. 1, the vehicle 100 may include a front end 102, a rear end 104, and a longitudinal center plane (not shown) defined consistently with the forward travel direction of the vehicle 100. The vehicle 100 may have a frame 108 for supporting the various components of the vehicle 100, and left and right front wheels 110 (the left front wheel being shown in FIG. 1) mounted to the frame 108. In particular, the left front wheel 110 may be mounted to the frame 108 on a left side thereof by a left front suspension assembly (not shown), while the right front wheel 110 may be mounted to the frame 108 on a right side thereof by a right front suspension assembly (not shown). More specifically, the left and right front wheels 110 may be rotatably mounted to left and right steering knuckles which may be supported by the left and right front suspension assemblies.

In certain non-limiting embodiments, a single rear wheel 118 may be mounted to the frame 108 at a rear end thereof by a rear suspension assembly 120. The left and right front wheels 110 and the rear wheel 118 each may have a tire secured thereto. In certain non-limiting embodiments, the front wheels 110 may be disposed equidistant from the longitudinal center plane, and the rear wheel 118 may be centered with respect to the longitudinal center plane.

In certain non-limiting embodiments, each front suspension assembly may be a double A-arm type suspension, also known as a double wishbone suspension, and may include a corresponding shock absorber. It is contemplated that other types of front suspensions, such as a McPherson strut suspension, or swing arm may be used. The rear suspension assembly 120 may include a swing arm 126 and a shock absorber (not shown). The shock absorber may be connected between the swing arm 126 and the frame 108. It is contemplated that other types of rear suspensions may be used.

The vehicle 100 may have a driver seat 130 mounted to an upper portion of the frame 108 and disposed along the longitudinal center plane. The vehicle 100 also may also have a passenger seat 134 disposed rearward of the driver seat 130. The passenger seat 134 may have a seat portion 135 and a backrest portion 136 for supporting the back of a passenger in the passenger seat 134. The seat portion 135 of the passenger seat 134 may be supported by and connected to a rear upper frame member 114 of the frame 108. In certain non-limiting embodiments, the driver and passenger seats 130, 134 may be straddle seats.

In certain non-limiting embodiments, driver footrests 132 may be disposed on both sides of the vehicle 100 to support the driver's feet. The driver footrests 132 may be connected to a lower portion of the frame 108. In certain non-limiting embodiments, the driver footrests 132 may be in the form of footboards extending longitudinally forward of the driver seat 130. The vehicle 100 may also be provided with passenger footrests 137 disposed rearward of the driver footrests 132 on both sides of the vehicle 100, for supporting the passenger's feet. A brake pedal (not shown) may be connected to the right driver footrest 132 for braking the vehicle 100.

As schematically illustrated in FIG. 1, the vehicle 100 may have a power pack, including a motor 138 and a transmission assembly 140. The power pack may be supported by and may be housed within the frame 108. The transmission assembly 140 may include a manual transmission, a semi-automatic transmission or a fully automatic transmission. The motor 138 may be in the form of an internal combustion engine. It is however contemplated that the motor 138 may be other than an internal combustion engine, for example an electric motor, a hybrid or the like. It is also contemplated that the transmission assembly 140 may be of another type, such as a manual transmission or a continuously variable transmission (CVT). The motor 138 may be operatively connected to the rear wheel 118 via the transmission assembly 140 to drive the rear wheel 118.

With continued reference to FIG. 1, the vehicle 100 may have a steering system 142 that may include a handlebar assembly 143, a steering column assembly (not shown) connected to the handlebar assembly 143, and a plurality of linkages operatively connecting the steering column assembly to the steering knuckles.

In certain non-limiting embodiments, the handlebar assembly 143 may include a handlebar 144 which may be disposed forward of the driver seat 130. A left hand grip may be placed around the left side of the handlebar 144 near the left end thereof and a right hand grip may be placed around the right side of the handlebar 144 near the right end thereof. The right hand grip may have a twist-grip type throttle control. It is contemplated that a different type and/or position of throttle control may be used. The handlebar 144 may be operatively connected to the front wheels 110 via the steering column assembly. The steering system may define a steering axis about which the handlebar 144 may rotate with respect to the frame 108. The handlebar 144 may be turned by the driver about the steering axis to steer the front wheels 110 and thereby steer the vehicle 100.

It should be understood that the front wheels 110 are one example of steerable ground-engaging members with which embodiments of the steering system 142 may be used. It is contemplated that embodiments of the steering system 142 may be used on vehicles where the steerable ground-engaging component(s) is/are skis or endless tracks for example.

The vehicle 100 may also have a plurality of fairings 148 that may enclose the motor 138 and the transmission assembly 140, thereby providing an external shell that not only protects the engine 138 and the transmission assembly 140, but also make the vehicle 100 more aerodynamic and aesthetically pleasing. The fairings 148 may include a hood 149 and one or more side panels which may be opened to allow access to the motor 138 and the transmission assembly 140 when required, for example for inspection or maintenance thereof. A windshield 146 may be connected to the fairings 148 near the front end 102 of the vehicle 100. The windshield 146 may act as a windscreen to lessen the force of the air on the driver while the vehicle 100 is moving.

The vehicle 100 may include various other components which are known in the art and therefore will not be described in detail herein.

Figure 2:
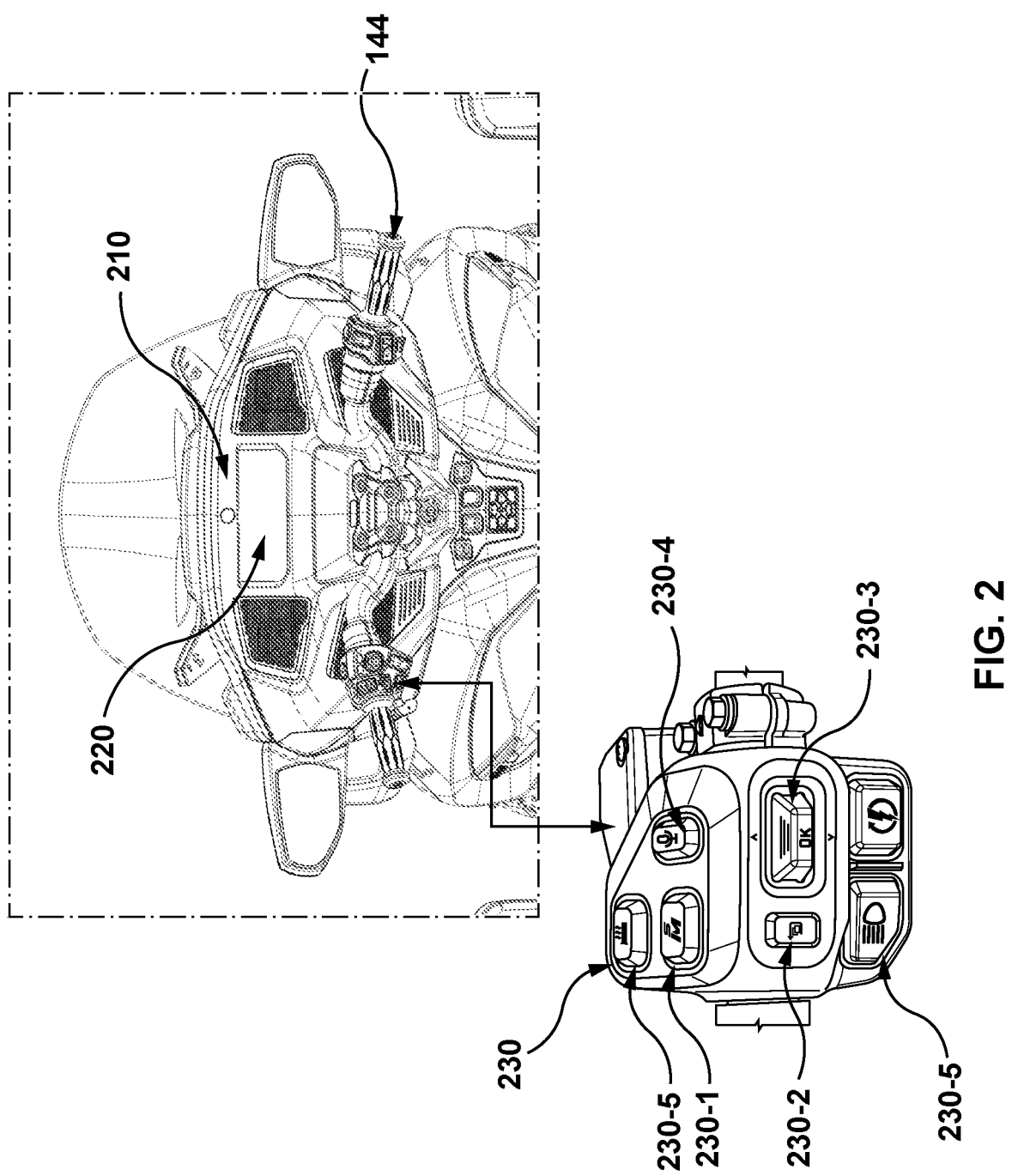
FIG. 2 is a partial view of the vehicle from a driver's seat illustrating a virtual cockpit system, in accordance with various non-limiting embodiments of the present disclosure.

FIG. 2 is a partial view of the vehicle 100 from the driver seat 130 illustrating a virtual cockpit system 210, in accordance with various non-limiting embodiments of the present disclosure. As shown, the virtual cockpit system 210 may include a display 220 and a controller 230. In certain non-limiting embodiments, the virtual cockpit system 210 may include a computer system (details of which will be discussed later in the disclosure).

In certain non-limiting embodiments, the display 220 may be configured to display various operating conditions and/or information about the vehicle 100, ambient conditions, infotainment (e.g., GPS, radio, wireless connectivity, Bluetooth™ connectivity, audio settings, navigation or the like), and/or any other information that may be useful to the driver during operation of the vehicle 100.

In some of non-limiting embodiments, the display 220 may be a touchscreen-based screen where the front surface of the display 220 may be touch sensitive. The display 220 may be capable of receiving input by the driver/operator touching the front surface of the display 220. In other non-limiting embodiments, the display 220 may be configured to receive inputs without being touched by the driver/operator. Such inputs may be provided by the driver/operator by using the controller 230.

In certain non-limiting embodiments, the controller 230 may be located on the handlebar 114. In some non-limiting embodiments, the controller 230 may be located on left side of the handlebar 114. While in other non-limiting embodiments, the controller 230 may be located on the right side of the handlebar 114. It is to be noted that where controller 230 is located should not limit the scope of present disclosure.

As shown, the controller 230 may include ride settings 230-1 (alternatively referred to as action switcher), an applet switcher 230-2, focus controllers 230-3, push-to-talk switch 230-4, and product specific switches 230-5. It is to be noted that the controller 230 may include other switches, however, such switches have not been illustrated in FIG. 2 for the purpose of simplicity.

In certain non-limiting embodiments, the focus controllers 230-3 may include an up/down switch and a selection switch. In one non-limiting embodiment, the product specific switches 230-5 may include switches, which may be specific to the vehicle 100 for example, a heated grip switch, a vehicle start switch, a headlight switch or the like.

It is contemplated that the controller 230 the arrangement of different switches as illustrated in FIG. 2 is merely one example. In various non-limiting embodiments, the switches on the controller 230 may have different arrangements.

Figure 3:
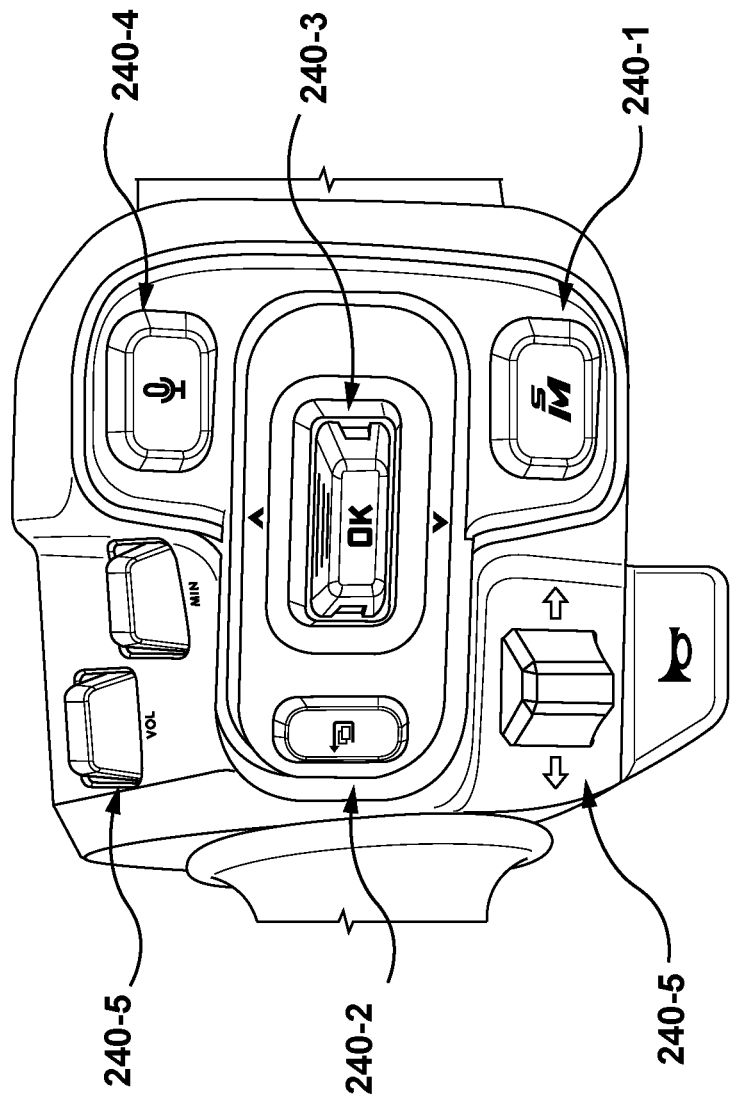
FIG. 3 illustrates a non-limiting example of a controller, in accordance with various non-limiting embodiments of the present disclosure.

FIG. 3 illustrates a non-limiting example of a controller 240 (almost similar to the controller 230 in terms of functionality), in accordance with various non-limiting embodiments of the present disclosure. As shown, the controller 240 may also have ride settings 240-1, an applet switcher 240-2, focus controllers 240-3, push-to-talk switch 240-4, and product specific switches 240-5 similar to the controller 230. However, the switches in the controller 240 may be arranged differently from the switches on the controller 230. More-over, the product specific switches 230-5 in this case may include volume switches, turn indicator switches, horn switch. As long as the controller 230 or 240 or any other arrangement of the controller includes the ride settings, an applet switcher, and focus controllers, the product specific switches may not limit the scope of the present disclosure.

Figure 4:
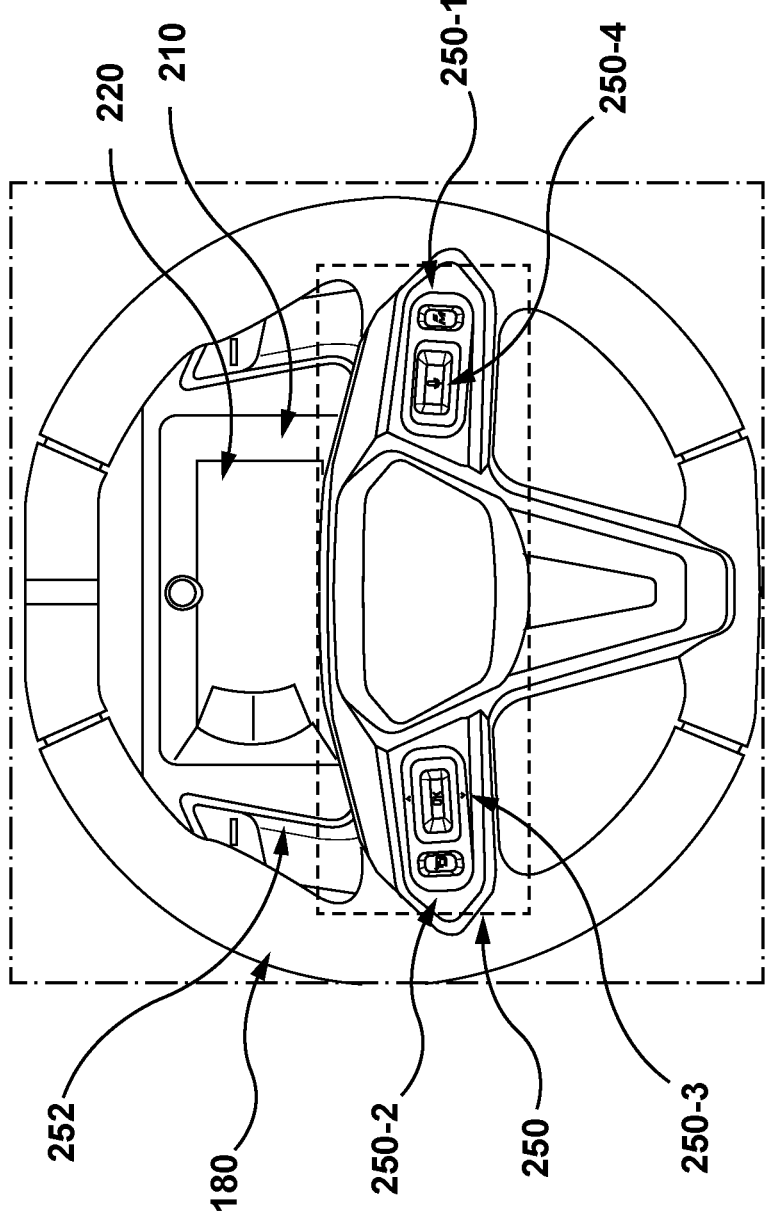
FIG. 4 illustrates another non-limiting example of the virtual cockpit system implemented on the vehicle that includes a steering wheel, in accordance with various non-limiting embodiments of the present disclosure.

FIG. 4 illustrates another non-limiting example of the virtual cockpit system 210 implemented on the vehicle 100 that may include a steering wheel 180 instead of the handle-bar 144, in accordance with various non-limiting embodiments of the present disclosure. In certain non-limiting embodiments, the steering system 142 may include the steering wheel 180 instead of the handlebar 144. In such non-limiting embodiments, the display 220 may be mounted on the dashboard 252 of the vehicle 100 and a controller 250 may be mounted to the steering wheel 180. As shown, the controller 250 may include ride settings 250-1, an applet switcher 250-2, focus controllers 250-3, and push-to-talk switch 250-4. It is to be noted that, regardless of the steering system 142 including the handlebar 144 or the steering wheel 180, the steering system 142 should not limit the scope of present disclosure.

Figure 5:
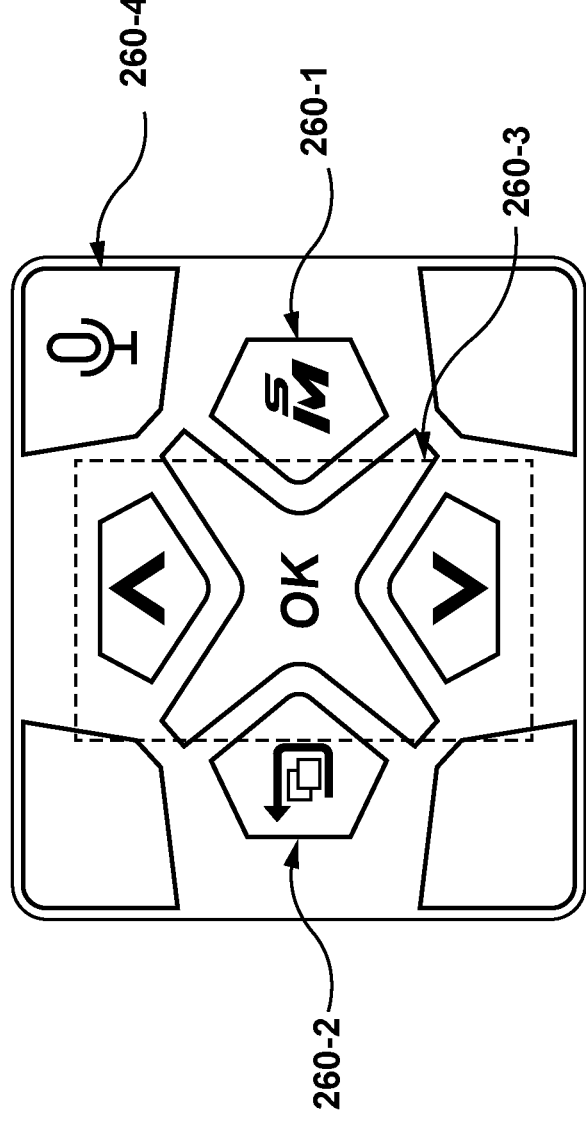
FIG. 5 illustrates another non-limiting example of the controller, in accordance with various non-limiting embodiments of the present disclosure.

In certain non-limiting embodiments, instead of the con-troller 230 or 240 being mounted on the handlebar 144, or the controller 250 being mounted on the steering wheel 180, a similar controller 260 (as shown in FIG. 5) may be located in a keypad, elsewhere on the vehicle 100 however, in proximate to the steering system 142. The controller 260 may also include ride settings 260-1, an applet switcher 260-2, focus controllers 260-3, and push-to-talk switch 260-4.

Hereinafter, various non-limiting embodiments will be discussed with reference to the controller 230. However, same embodiments may be equally applicable to the con-troller 240, 250 and 260.

Returning to FIG. 2, in certain non-limiting embodiments, at least the ride settings 230-1, the applet switcher 230-2, and the focus controllers 230-3 may be virtual switches and displayed on the display 220. In such non-limiting embodi-ments, the ride settings 230-1, the applet switcher 230-2, and the focus controllers 230-3 may perform their functionalities based on touchscreen-based interaction of the driver/opera-tor with the display.

Figure 6:
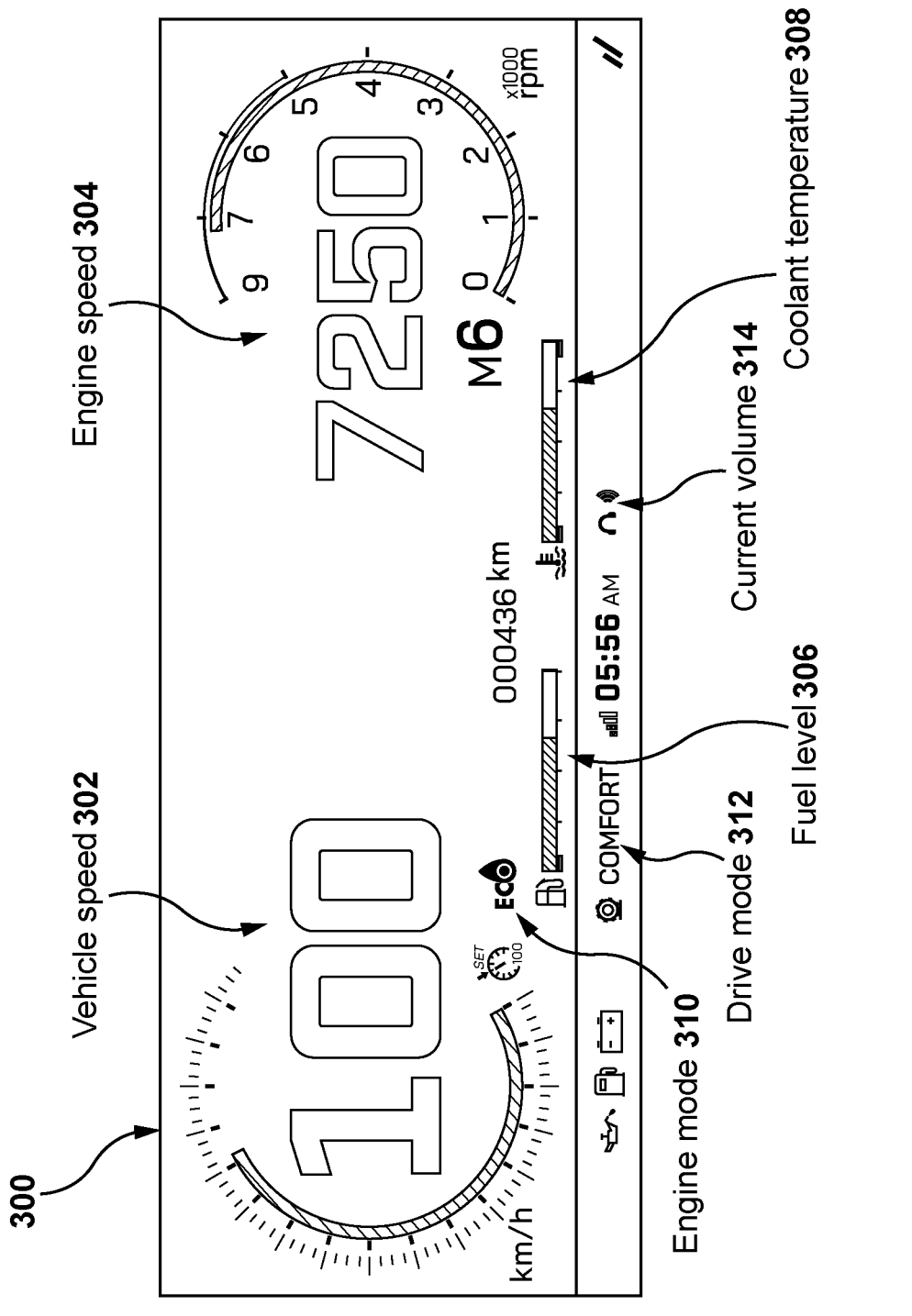
FIG. 6 illustrates a first graphic user interface (GUI) component initially displayed on a display (of FIG. 2), in accordance with various non-limiting embodiments of the present disclosure.

In certain non-limiting embodiments, initially when the vehicle 100 is turned on, the display 220 may display a graphic user interface (GUI) component. FIG. 6 illustrates a first GUI component 300 initially displayed on the display 220 (of FIG. 2), in accordance with various non-limiting embodiments of the present disclosure. The first GUI com-ponent 300 may be initially displayed when the vehicle 100 is turned on. The first GUI component 300 may represent a first set of information relating to operating conditions of the vehicle 100. The first set of information may include for example, a vehicle speed 302, an engine speed 304, a fuel level 306, a coolant temperature 308, an engine mode 310, a drive mode 312, and a current volume 314. It is to be noted that the first set of information may include any other information useful to the driver/operator while driving the vehicle 100. The display 220 may continue to display the first GUI component 300 unless the display 220 receives a control command.

In certain non-limiting embodiments, the vehicle 100 may be required to display, at all times, a certain minimum of vehicle information, for example the vehicle speed 302, the engine speed 304, the fuel level 306 and the coolant tem-perature 308. Laws may vary by type of vehicle and juris-diction. For example, electric vehicles may have an equiva-lent but different set of minimum vehicle information, for example vehicle speed, battery state of charge, range, or the like.

As previously discussed, various conventional vehicles may have different dedicated switches corresponding to a variety of vehicle functionalities that the driver/operator may adjust during the use of the vehicle. However, such dedicated switches may cause the driver/operator to get distracted while driving the vehicle, thereby increasing chances of mishaps. Alternatively, various conventional vehicles may provide access to a variety of vehicle func-tionalities through the use of the system settings menus and sub-menus.

To avoid such a scenario, in various non-liming embodi-ments, the vehicle 100 may be provided with the controller 230. In particular, the ride settings 230-1 along with the focus controllers 230-2 may be used a shortcut to various functionalities that may control the operational behavior of the vehicle 100 and the accessories (e.g., windshield, wipers, etc.). This may assist the driver/operator to adjust various functionalities of the vehicle 100 without having a need to look for different dedicated switches, resulting in reducing the distraction of the driver/operator. In addition, having few switches to access and adjust various functionalities of the vehicle 100 may result in simpler hardware requirements.

Figure 7:
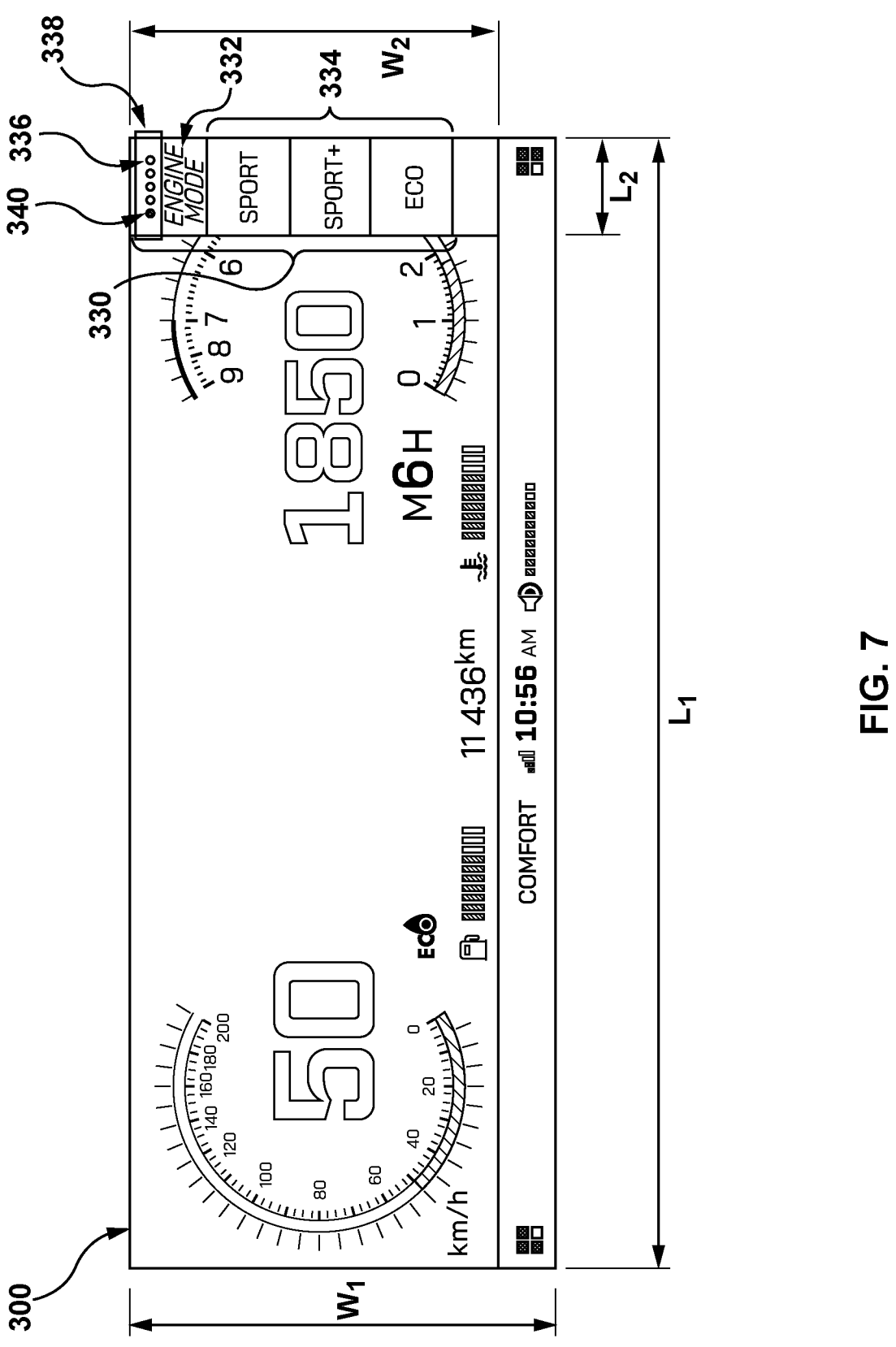
FIG. 7 illustrates second, third, and fourth GUI components displayed on the display (of FIG. 2) in response to a first control command, in accordance with various non-limiting embodiments of the present disclosure.

With this said, based on the driver's/operator's interaction with (e.g., pressing) the ride settings 230-1, the controller 230 may generate a first control command. Based on the first control command, the display 220 may be configured to display a second GUI component 330 (as shown in FIG. 7) comprising a third GUI component 332 and a fourth GUI component 334.

The third GUI component 332 may represent a first controllable functionality of the vehicle 100. The fourth GUI component 334 may represent a first modifiable setting of the first controllable functionality of the vehicle 100. By way of example, the first controllable functionality may an engine mode functionality and the corresponding first modi-fiable setting may be "SPORT", "SPORT+" or ECO, which vary the engine's throttle response to a given driver throttle request.

In case the first controllable functionality is the function-ality that the driver/operator may be intended to adjust or modify, the drive/operator may use the focus controllers 230-3 (the up/down switch and the selection switch) to make a selection, for example changing the engine mode func-tionality from "ECO" mode to "SPORT" mode. In other words, the focus controllers 230-3 may be configured to allow the driver/operator to modify the first modifiable setting if the first controllable functionality is active (i.e., currently being displayed by the third GUI).

In certain non-limiting embodiments, the driver/operator may also be able to make a selection by touching the display 220. The display 220 being touch sensitive may allow to change the mode of the engine mode functionality based on the touch input from the driver/operator.

In case the first controllable functionality is not the functionality that the driver/operator may intend to adjust or modify, the drive/operator may interact with (e.g., press) the ride settings 230-1 again. In doing so, the controller 230 may generate a second control command. Based on the second control command, the display 220 may be configured to update the third GUI component 332 by representing a second controllable functionality of the vehicle 100 in replacement of the first controllable functionality. Also, based on the second control command, the display 220 may be configured to update the fourth GUI component 334 by representing a second modifiable setting of the second controllable functionality of the vehicle 100 in replacement of the first modifiable setting of the first controllable functionality.

Thus, the ride settings 230-1 may allow the operator to circle from the first controllable functionality to the second controllable functionality. In certain non-limiting embodiments, updating the third GUI component 332 by representing the second controllable functionality in replacement of the first controllable functionality may define cycling through a carousel of possible actions for the operator.

By way of example, the second controllable functionality may be a drive mode functionality and the corresponding second modifiable setting may be "ROCK CRAWLER", or "MUD". The drive/operator may use the focus controllers 230-3 (the up/down switch and the selection switch) to make a selection, for example changing the drive mode functionality from "ROCK CRAWLER" mode to "MUD" mode. In other words, the focus controllers 230-3 may be configured to allow the driver/to modify the second modifiable setting if the second controllable functionality is active (i.e., currently being displayed by the third GUI).

In certain non-limiting embodiments, the second GUI component may further comprise a fifth GUI component 336. The fifth GUI component 336 may represent an indicator 340 of an active controllable functionality amongst a list of indicators 338 representing a plurality of controllable functionalities. By way of example, the indicator 340 may be highlighted with a different colour as compared to the other indicators in the list of indicators 338. The indicator which is highlighted may represent the active controllable functionality. In FIG. 7, the indicator 338 is highlighted as orange while the remaining indicators in the list of indicators 338 may be white in colour. Further, the active controllable functionality corresponding to the indicator 340 may be the engine mode functionality.

In certain non-limiting embodiments, based on the second control command, the display 220 may cause the indicator 340 to be updated so as to reflect a change in the active controllable functionality. In other words, based on the second control command, the display 220 may now highlight the next indicator in the list of indicators 338 to represent the next controllable functionality being displayed by the third GUI component 332.

Figure 8A:
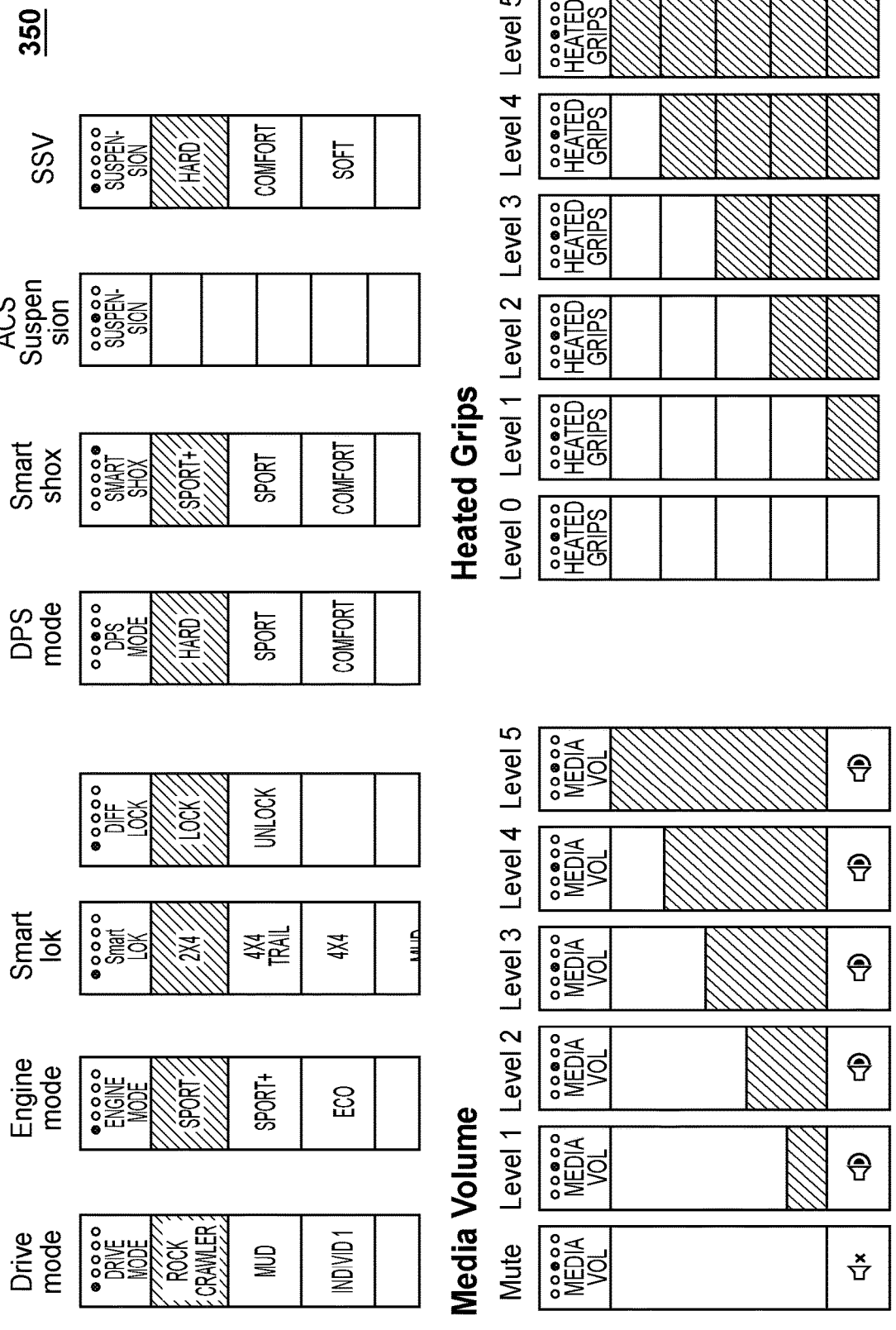
FIGS. 8A and 8B illustrate a list of controllable functionalities along with the respective modifiable settings, in accordance with various non-limiting embodiments of the present disclosure.
Figure 8B:
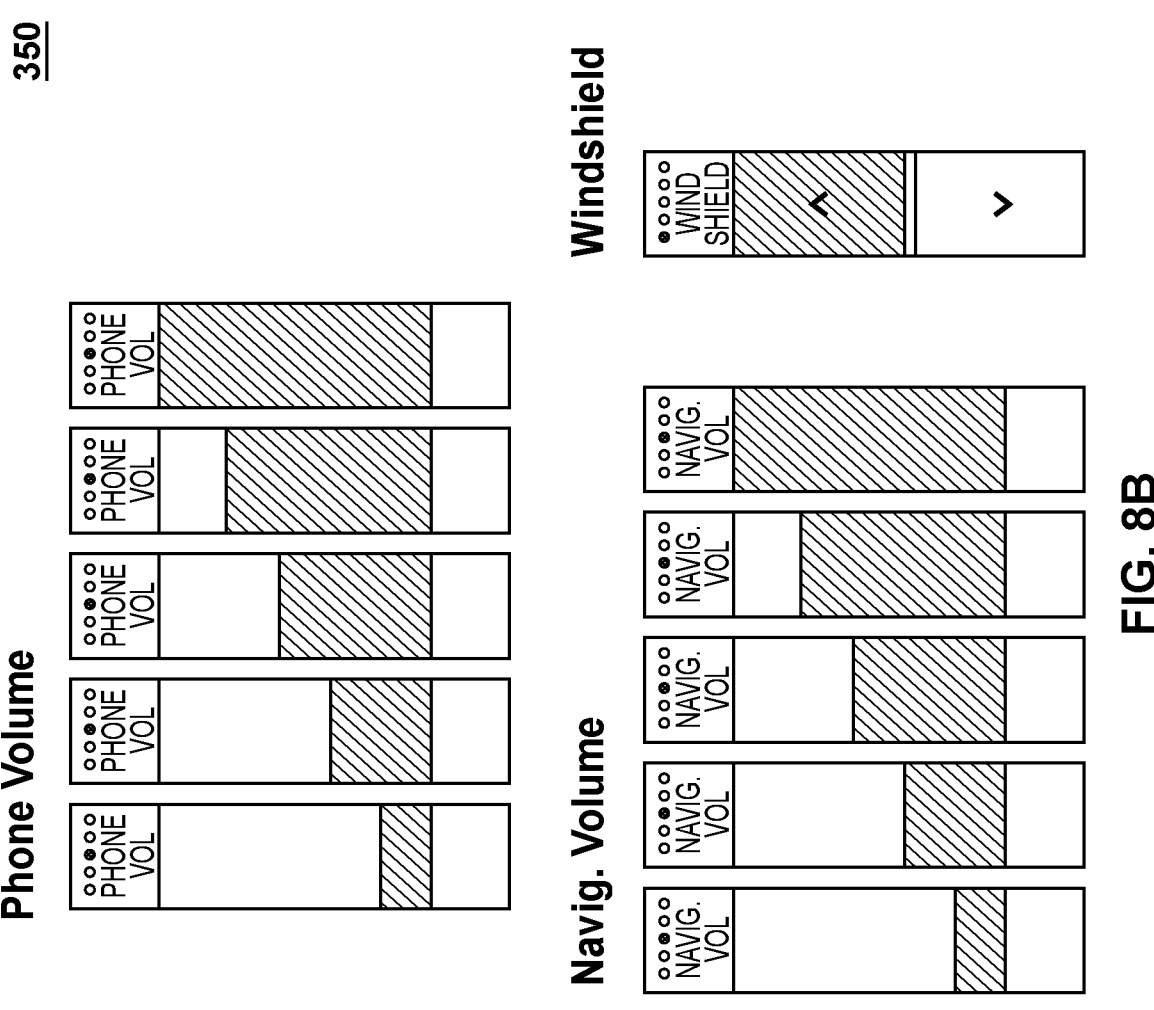

FIGS. 8A and 8B illustrate a list of controllable functionalities 350 along with the respective modifiable settings, in accordance with various non-limiting embodiments of the present disclosure. As shown, the list of controllable functionalities 350 may include drive mode, engine mode, differential mode (such as "Smart-Lok"), power steering mode (such as "DPS mode", which stands for dynamic power steering), suspension modes (such as "Smart-Shox" and "ACS Suspension", which stands for air controlled suspension), media volume, heated grips, phone volume, navigation volume, windshield, or the like.

Further, at least some of the controllable functionalities 350 (e.g., Drive mode, Smart-Shox, DPS mode, smart shox, ACS suspension, or the like) may be associated with a sub-system of the vehicle 100. Adjustments of such controllable functionalities may result in a modification of operational performance of the vehicle 100. Also, at least some of the controllable functionalities 350 (e.g., media volume, heated grips, phone volume, navigation volume, windshield) may be associated the accessories associated with the vehicle 100. Some of these controllable functionalities associated with the accessories of the vehicle 100 may also be available via product specific switches 230-5.

Figure 9:
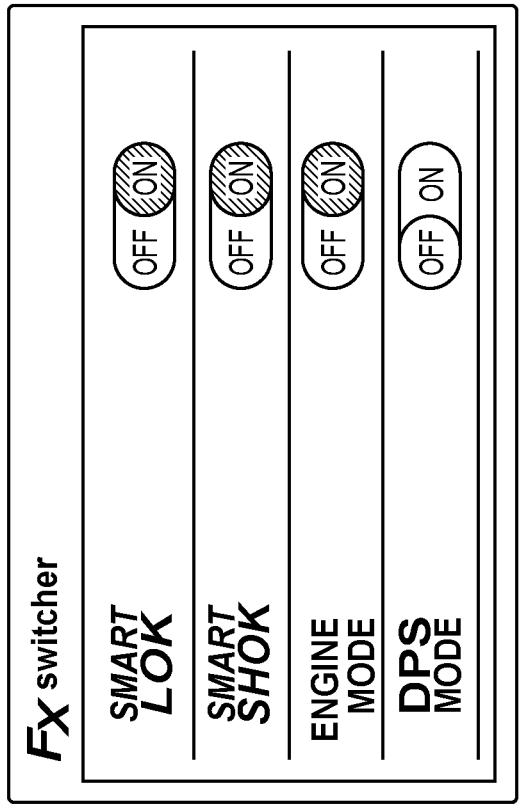
FIG. 9 illustrates a GUI for customizing the list of controllable functionalities, in accordance with various non-limiting embodiments of the present disclosure.

It is to be noted that the illustrated list of controllable functionalities 350 is non-limiting and the list of controllable functionalities 300 may be customizable (e.g., adding or removing of controllable functionalities). FIG. 9 illustrates a GUI 360 for customizing the list of controllable functionalities 350, in accordance with various non-limiting embodiments of the present disclosure. In certain non-limiting embodiments, the GUI 360 may be displayed in response to the interaction of the driver/operator with the system settings menu.

Figure 10:
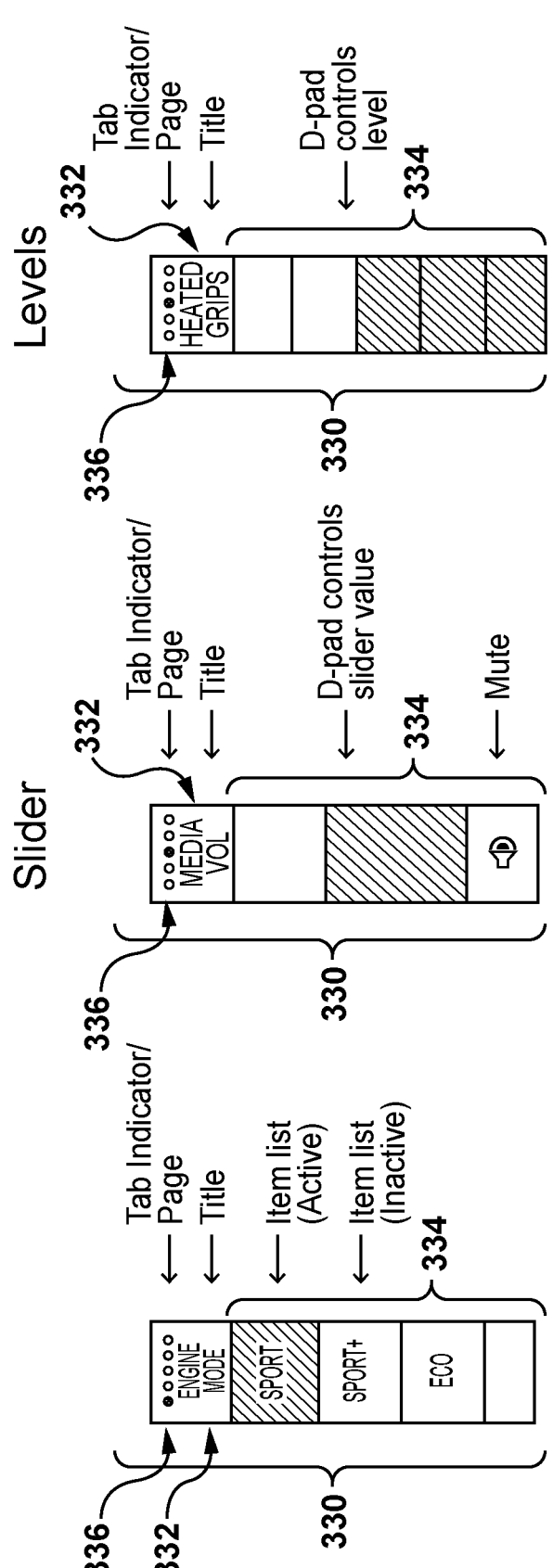
FIG. 10 illustrates a structure of the second GUI component, in accordance with various non-limiting embodiments of the present disclosure.

FIG. 10 illustrates a structure 370 of the second GUI component 330, in accordance with various non-limiting embodiments of the present disclosure. As previously discussed, (in FIG. 7), the second GUI component 330 may comprise the third GUI component 332, the fourth GUI component 334 and the fifth GUI component 336. The fifth GUI component 336 may display the list of indicators 338 along with the indicator 340 which may be currently highlighted representing an active controllable functionality. The third GUI component 332 may display the active controllable functionality. The fourth GUI component 334 may display the modifiable settings associated with the active controllable functionality.

Returning to FIG. 7, in certain non-liming embodiments, depending on a type of the active controllable functionality, the fourth GUI component 334 may display a list of settings, a slider value or control levels. By way of example, if the active controllable functionality is the engine mode, the fourth GUI component 334 may display a list of associated settings such as sport mode, sport+ mode, and eco mode. In addition to the list, the fourth GUI component 334 may also highlight the currently active setting (e.g., sport mode). In another example, if the active controllable functionality is the media volume, the fourth GUI component 334 may display the slider value of the media volume. In yet another example, if the active controllable functionality is the heated grips, the fourth GUI component 334 may display the control levels of the heated grips.

In certain non-limiting embodiments, the first GUI component 300 may extend horizontally from a left side of the display 220 to a right side of the display 220. The second GUI component 330 may be located adjacent to the first GUI component 300. The second GUI component 330 may extend vertically from a top of the display 220 to a bottom of the display 220. In certain non-limiting embodiments, a width $W_1$ of the first GUI component 300 may be greater than a length $L_1$ of the first GUI component 300. Also, a width $W_2$ of the second GUI component 330 may be smaller than a length $L_2$ of the second GUI component 330.

In certain non-limiting embodiments, the second GUI component 330 may define a modal view that may be temporarily displayed on the display 220. The modal view may pop-up adjacent to the right side of the first GUI component 300. Once the intended functionalities have been adjusted by the driver/operator, the second GUI component 330 may be removed from the display 220.

Figure 11:
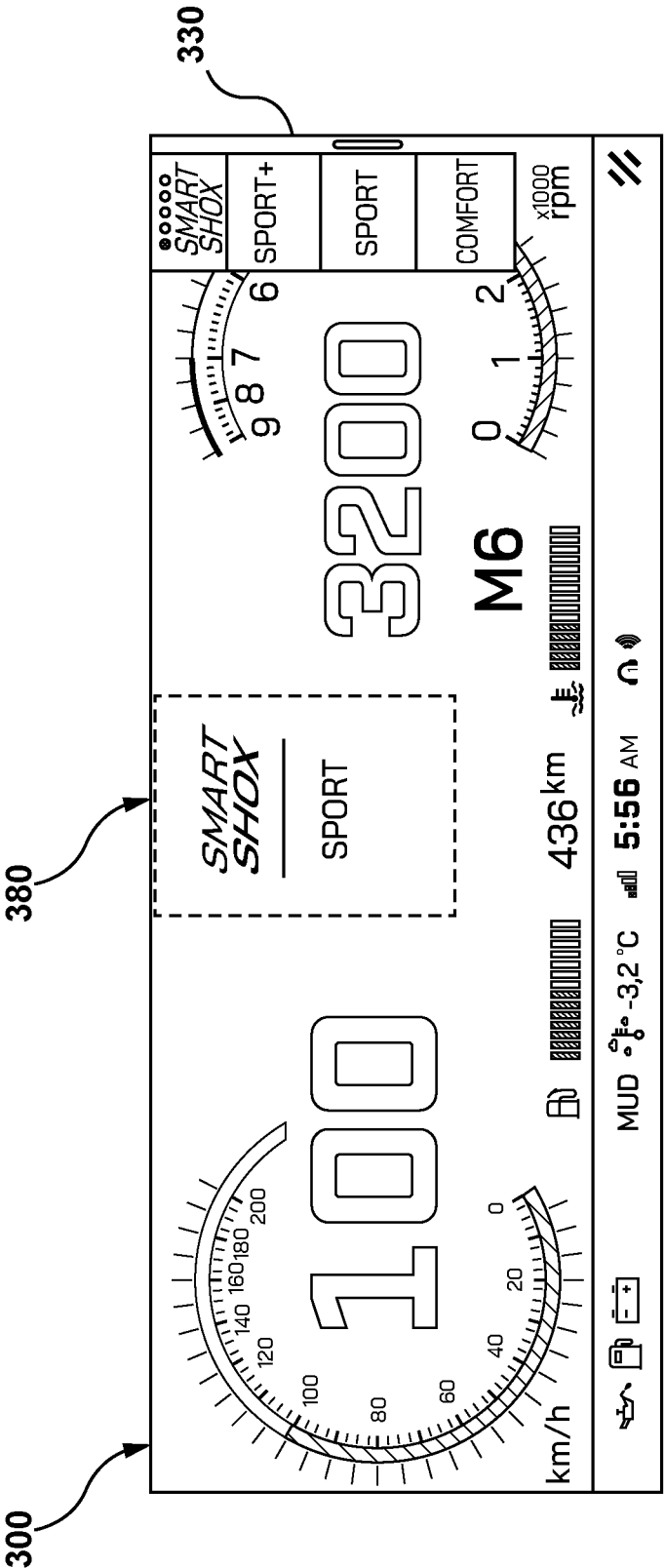
FIG. 11 illustrates another example of the first GUI component and the second GUI component, in accordance with various non-limiting embodiments of the present disclosure.

FIG. 11 illustrates another example of the first GUI component 300 and the second GUI component 330, in accordance with various non-limiting embodiments of the present disclosure. In certain non-limiting embodiments, a central space 380 of the first GUI component 300 may be utilized to display and access a selected controllable functionality. By way of an example, if the suspension mode was previously selected, then it's selected setting (e.g., sport) may always be displayed in the central space 380. In addition, the driver/operator may access and change the suspension mode (from "sport" to "comfort", for example) by simply pressing up/down on the focus controllers 230-3 without the need to first press the ride settings 230-1. However, to access the other controllable functionalities, the driver/operator may be required to first press the ride settings 230-1 and cycle through the carousel, as previously.

Figure 12:
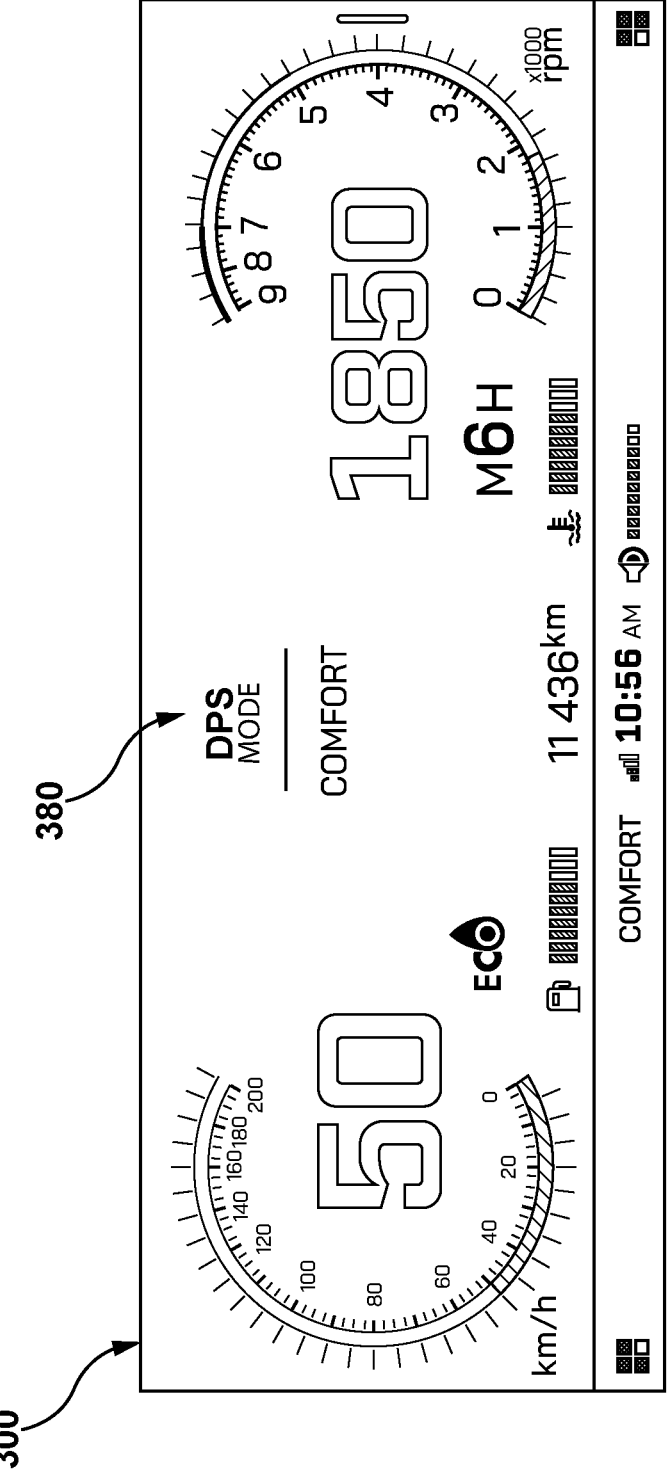
FIG. 12 illustrates another example of the first GUI component, in accordance with various non-limiting embodiments of the present disclosure.

FIG. 12 illustrates another example of the first GUI component 300, in accordance with various non-limiting embodiments of the present disclosure. As shown, the central space 380 displays a previously selected controllable functionality (DPS mode) and the selected associated modifiable setting ("comfort"). In order to change this modifiable setting, in certain non-limiting embodiments, the driver/operator may simply press up/down on the focus controllers 230-3 to traverse through other associated modifiable settings and may press the selection switch on the focus controllers 230-3 to select the intended setting.

Figure 13:
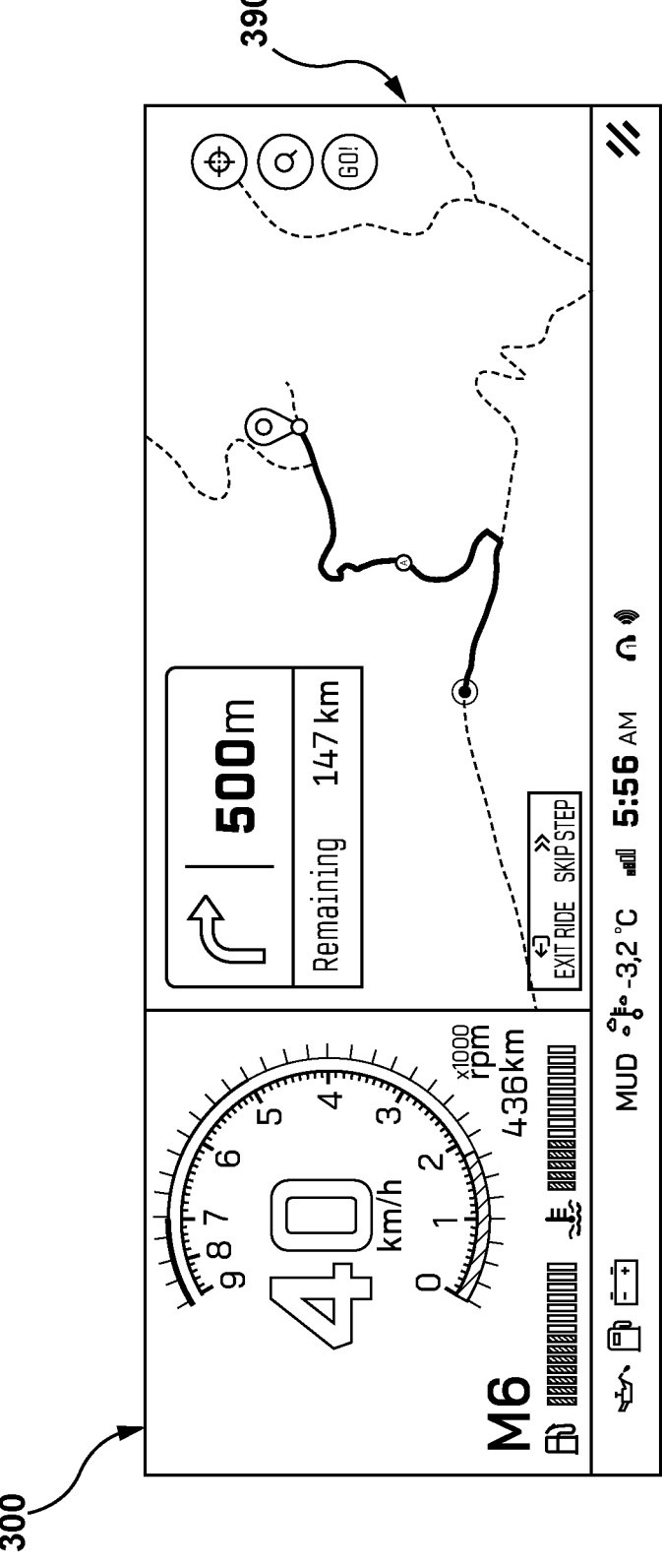
FIG. 13 illustrates the first GUI component and a sixth GUI component, displayed on the display (of FIG. 2) in response to a third control command, in accordance with various non-limiting embodiments of the present disclosure.

In certain non-limiting embodiments, the driver/operator may interact with the applet switcher 230-2. The first interaction (after the vehicle 100 is turned on) of the driver/operator with the applet switcher 230-2, the controller 230 may be configured to generate a third control command. Based on the third control command from the controller 230, the display 220 may be configured to display a sixth GUI component 390 (as shown in FIG. 13) representing a second set of information, the second set of information relating to infotainment functionalities associated with the vehicle 100.

As previously discussed, initially when the vehicle 100 is turned on, the display 220 may display the first GUI component 300 including the first set of vehicle information. The vehicle 100 may be required to display a minimum vehicle information at all times. In addition to this minimum vehicle information, the driver/operator may have an option of displaying, in the sixth GUI component 390, content from one of a number of applications which may be inbuilt vehicle applications (e.g., native vehicle navigation, contacts/place call, ride data, rear camera, native vehicle media player/radio or the like).

In case the vehicle 100 is connected to a smartphone, the driver/operator may have an option of displaying, in the sixth GUI component 390, content from one of a number of applications which may be associated with the smartphone (e.g., Apple Maps™/Google Maps™, weather, Spotify™, etc.) along with a vehicle menu and Apple CarPlay™/ Android Auto™ home screen. In certain non-limiting embodiments, one or more applications may be displayed, in the sixth GUI component 390, on the right side of the display 220. The driver/operator may switch between applications displayed on the right side of the display 220 by the applet switcher 230-2.

When the applet switcher 230-2 may be pressed by the driver/operator for the first time after the vehicle 100 is turned on, the first application on the carousel may be displayed in the sixth GUI component 390. By way of example, the first application on the carousel may be a navigation application (as shown in FIG. 13).

Figure 14:
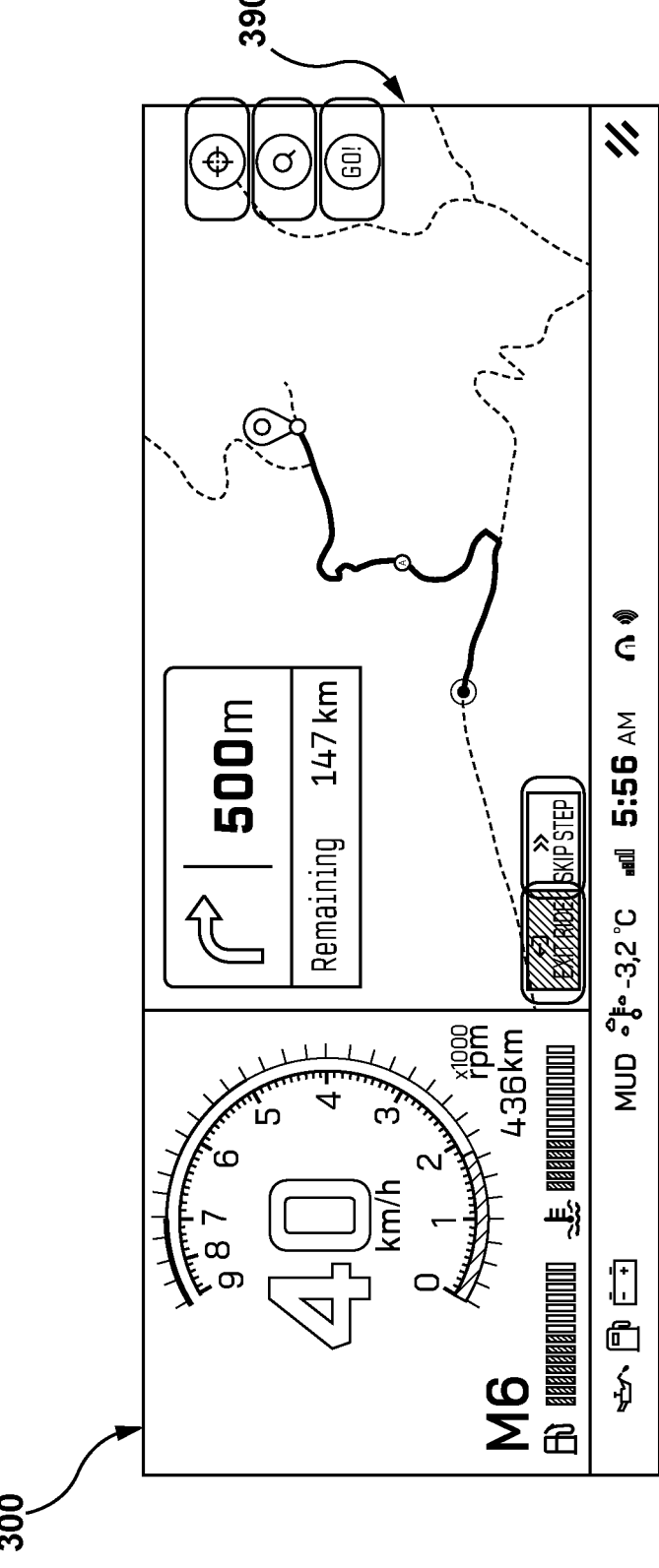
FIG. 14 illustrates another example of the first GUI component and the sixth GUI component, displayed on the display (of FIG. 2), in accordance with various non-limiting embodiments of the present disclosure.

In certain non-limiting embodiments, when a given application is displayed, some or all of the functions within that application may be accessed via the focus controllers 230-3. For example, when the native vehicle navigation application is being displayed on the sixth GUI component 390, the user/operator may have access to five functions: "EXIT RIDE", "SKIP STOP", GEO LOCATE, ZOOM AND "GO!" (as shown in FIG. 14) via the focus controllers 230-3. For example, the up/down switches of the focus controllers 230-3 may be used to navigate through the five functions and the selection switch of the focus controllers 230 may be used to select an intended function.

Similarly, if a media application is displayed on the sixth GUI component 390, the up/down switch of the focus controllers 230-3 may either raise/lower the volume or skip/rewind the track. Pressing the ride settings 230-1 or the applet switcher 230-2 may nonetheless cycle between the controllable functionalities and applications and thereby alter the effect of the focus controllers 230-3, as described above.

Figure 15:
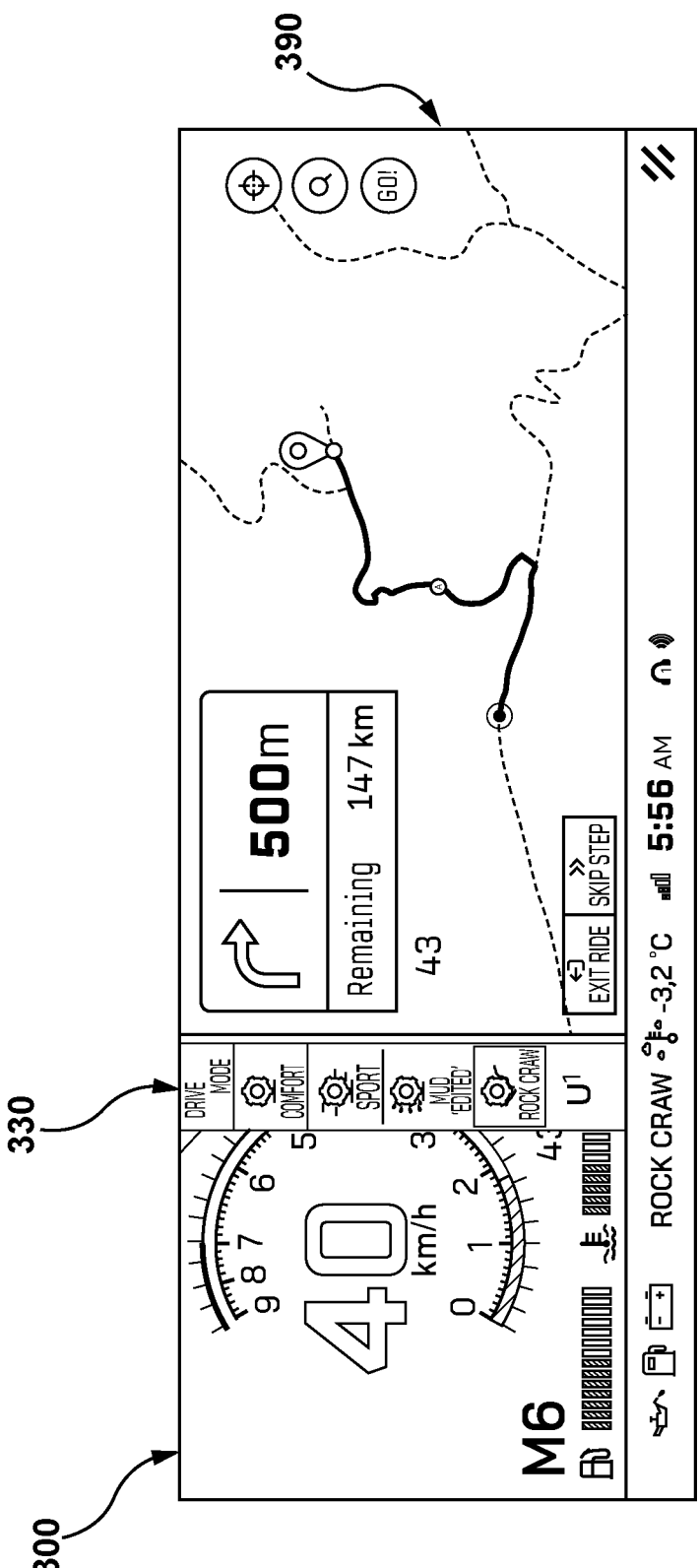
FIGS. 15-17 illustrate various examples of the first, second and sixth GUI components, displayed on the display (of FIG. 2), in accordance with various non-limiting embodiments of the present disclosure.
Figure 16:
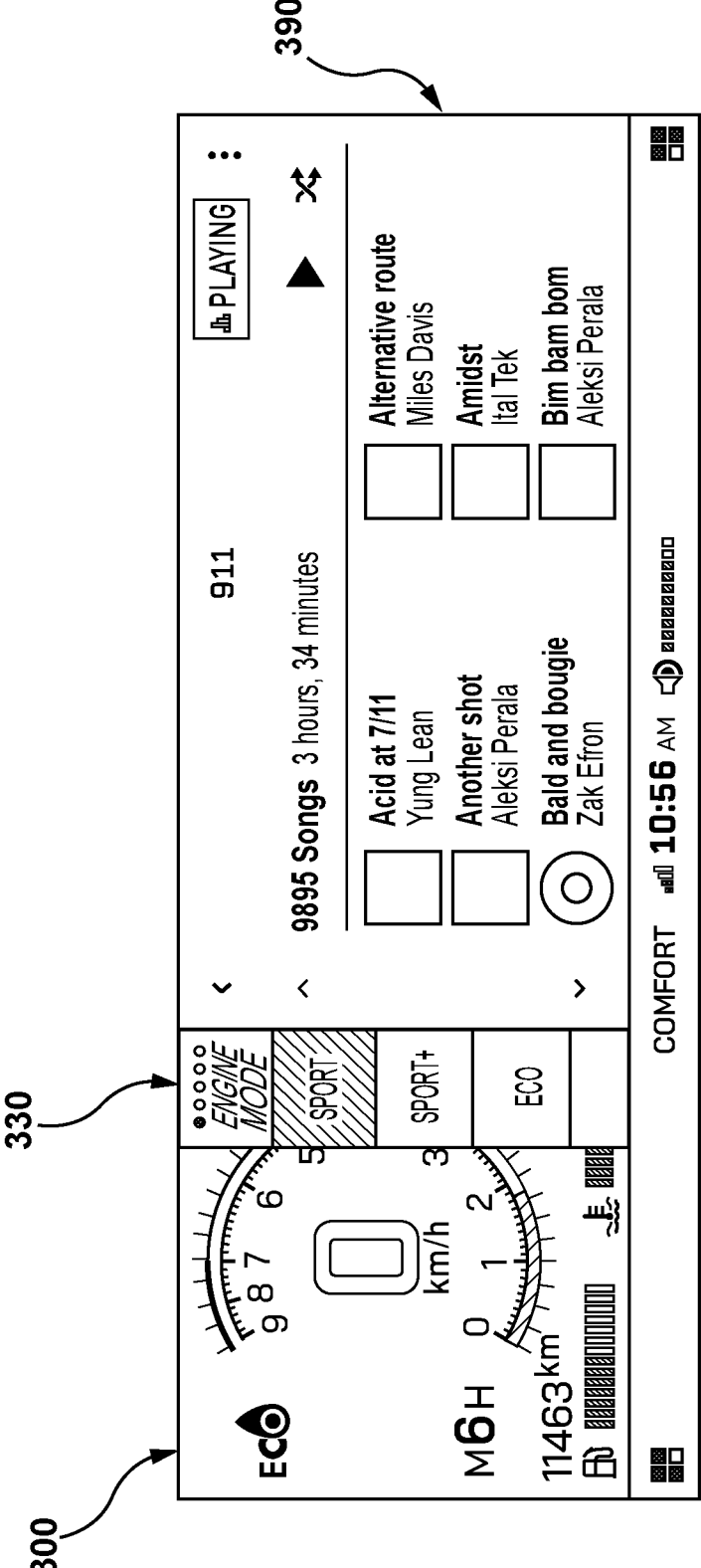
Figure 17:
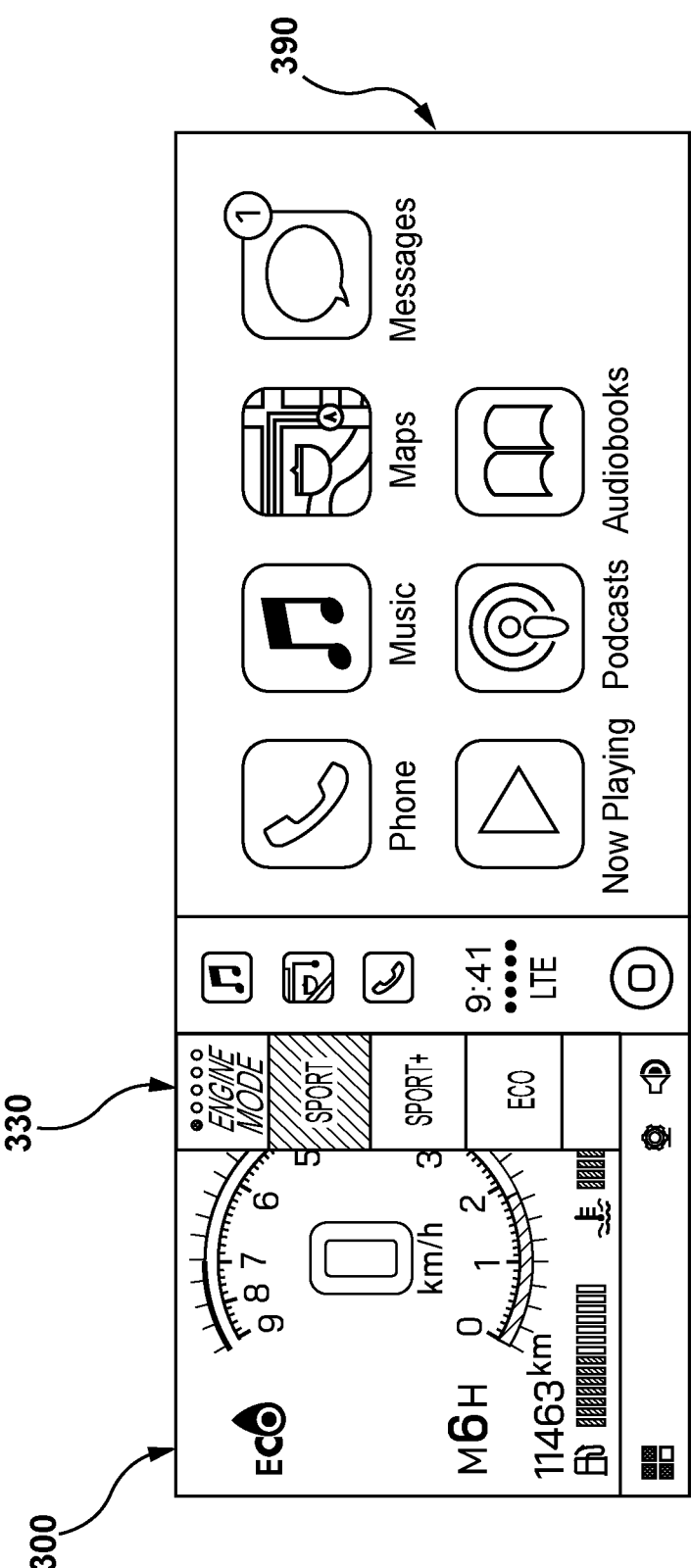

In certain non-limiting embodiments, when the display 220 is displaying the first GUI component 300 and the sixth GUI component 390 and the driver/operator presses the ride settings 230-1, the display 220 may be configured to display the second GUI component 330. However, in this case the second GUI component 330 may be located in between the first GUI component 300 and the sixth GUI component 390. FIGS. 15-17 illustrate various examples of the first, second and sixth GUI components (300, 330, and 390), displayed on the display 220, in accordance with various non-limiting embodiments of the present disclosure.

Thus, by virtue of the ride settings 230-1 and the second GUI component 330, various controllable functionalities may be accessed without requiring dedicated switches that take up space on or near the steering system 142 and navigating through various controllable functionalities is more convenient.

Figure 18:
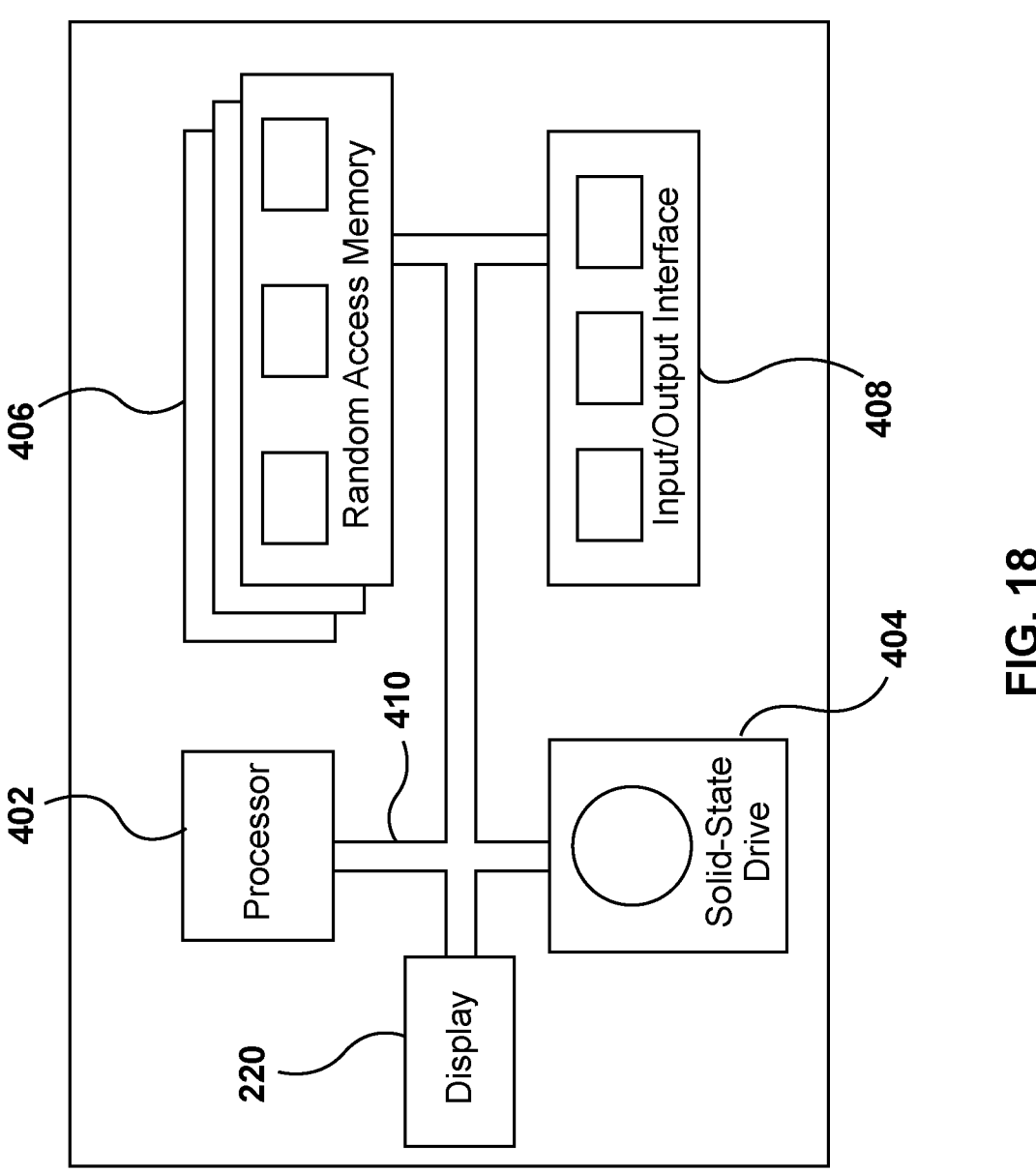
FIG. 18 illustrates a high-level functional block diagram of a computing environment included in the virtual cockpit system, in accordance with various non-limiting embodiments of the present disclosure.

FIG. 18 illustrates a high-level functional block diagram of a computing environment 400 included in the virtual cockpit system 210, in accordance with various non-limiting embodiments of the present disclosure. In some embodiments, the computing environment 400 may be implemented by any of a conventional personal computer, a computer dedicated to operating representing information to an operator, a remote server and/or an electronic device (such as, but not limited to, a mobile device, a tablet device, a server, a controller unit, a control device, a monitoring device, etc.) and/or any combination thereof appropriate to the relevant task at hand. In some embodiments, the computing environment 400 comprises various hardware components including one or more single or multi-core processors collectively represented by a processor 402, a solid-state drive 404, a random access memory 406, and an input/output interface 408.

The computing environment 400 may be a computer specifically designed for representing information to an operator of a recreational vehicle. In some alternative embodiments, the computing environment 400 may be a generic computer system, laptop, tablets, smart phones, desktop or the like.

In some embodiments, the computing environment 400 may also be a sub-system of one of the above-listed systems. In some other embodiments, the computing environment 400 may be an "off the shelf" generic computer system. In some embodiments, the computing environment 400 may also be distributed amongst multiple systems. In some embodiments, the computing environment 400 is virtualized in the "cloud" so that processing power and/or memory capacity may be scaled up or down depending on actual needs for executing implementations of the present technology. The computing environment 400 may also be specifically dedicated to the implementation of the present technology. In some embodiments, the computing environment 400 may be configured to operate in offline mode and all the operation may be performed locally on the computing environment 400 without the need to any communication with an external server/cloud. In offline mode, the computing environment 400 may also be configured to share its data with the server/cloud whenever a connection to the network is ready. In some embodiments, the computing environment 400 may be configured to operate to perform at least some of its operations in online mode that is, the computing environment 400 may be connected to a network to increase processing power and/or memory capacity. As a person in the art of the present technology may appreciate, multiple variations as to how the computing environment 400 is implemented may be envisioned without departing from the scope of the present technology.

Communication between the various components of the computing environment 400 may be enabled by one or more internal and/or external buses 410 (e.g. a PCI bus, universal serial bus, IEEE 1394 "Firewire" bus, SCSI bus, Serial-ATA bus, ARINC bus, CAN bus etc.), to which the various hardware components are electronically coupled.

The input/output interface 408 may allow enabling networking capabilities such as wire or wireless access. As an example, the input/output interface 408 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network, allowing communication among small groups of computers on the same local area network (LAN) and large-scale network communications through routable protocols, such as Internet Protocol (IP).

According to implementations of the present technology, the solid-state drive 404 stores program instructions suitable for being loaded into the random access memory 406 and executed by the processor 402 for representing information to an operator of a recreational vehicle. For example, the program instructions may be part of a library, an application, API, framework, Software as a service (SaaS) or the like. The solid-state drive 404 may also store various databases including metadata, user information such as login, activity history or the like.

In certain non-limiting embodiments, the display 220 may be coupled with the processor 402, the solid-state drive 404, random access memory 406, Input/output Interface 408 via one or more internal and/or external buses 410. The processor 402 may be configured to execute the instructions stored in the solid-state drive and/or the random access memory 406 and may control the content to be displayed on the display 220.

FIG. 19 depicts a flowchart of a process 500 representing a method for presenting information to an operator of a recreational vehicle, in accordance with various non-limiting embodiments of the present disclosure. As shown, the process commences at step 502, where a first graphical user interface (GUI) component representing a first set of information is displayed, the first set of information relating to operating conditions of the recreational vehicle.

As discussed above, the display 220 may display the first GUI component 300 representing the first set of information. The first set of information may be related to the operating condition of the vehicle 100.

The process 500 advances to step 504, where upon receiving, from the controller, a first control command, displaying, on the display, a second GUI component comprising a third GUI component and a fourth GUI component, the third GUI component representing a first controllable functionality of the recreational vehicle, the fourth GUI component representing a first modifiable setting of the first controllable functionality of the recreational vehicle.

As noted previously, the driver/operator may interact with the ride settings 230-1. In response to the interaction, the controller 230 may generate the first control command. Based on the first control command, the display 220 may display the second GUI component 330. The second GUI component 330 may include the third GUI component 332 and the fourth GUI component 334. The third GUI component 332 may represent a first controllable functionality of the vehicle 100. The fourth GUI component 334 may represent a first modifiable setting of the first controllable functionality of the vehicle 100.

Finally, the process advances to step 506, where upon receiving, from the controller, a second control command, updating the third GUI component by representing a second controllable functionality of the recreational vehicle in replacement of the first controllable functionality and updating the fourth GUI component by representing a second modifiable setting of the second controllable functionality of the recreational vehicle in replacement of the first modifiable setting of the first controllable functionality.

As noted above, the driver/operator may again interact with the ride settings 230-1. In response to the second interaction, the controller 230 may generate the second control command. Based on the second control command, the display 220 may update the third GUI component 332 to represent the second controllable functionality of the vehicle 100 in replacement of the first controllable functionality. Also, the display 220 may update the fourth GUI component 334 to representing a second modifiable setting of the second controllable functionality of the vehicle 100 in replacement of the first modifiable setting of the first controllable functionality.

It is to be understood that the operations and functionality of the virtual cockpit system 210, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A virtual cockpit system for a recreational vehicle, the virtual cockpit system comprising a display, a controller and a processor, the display being configured for presenting information to an operator of the recreational vehicle, the controller being configured for allowing interactions between the operator and the virtual cockpit system, the processor being configured for executing instructions which upon being executed cause:

displaying, on the display, a first graphical user interface (GUI) component representing a first set of information, the first set of information relating to operating conditions of the recreational vehicle;

upon receiving, from the controller, a first control command, displaying, on the display, the first GUI component and a second GUI component comprising a third GUI component and a fourth GUI component, the third GUI component representing a first controllable functionality of the recreational vehicle corresponding to a first component of the recreational vehicle, the fourth GUI component representing a first modifiable setting of the first controllable functionality of the recreational vehicle;

upon receiving, from the controller, a second control command corresponding to the first modifiable setting, modifying a functionality of the first component of the recreational vehicle, thereby causing a modification of operational performance of the recreational vehicle; and upon receiving, from the controller, a third control command, updating the third GUI component by replacing the first controllable functionality of the recreational vehicle with a second controllable functionality of the recreational vehicle corresponding to a second component of the recreational vehicle that is different from the first component and updating the fourth GUI component by replacing the first modifiable setting of the first controllable functionality of the recreational vehicle with a second modifiable setting of the second controllable functionality of the recreational vehicle.

2. The virtual cockpit system of claim 1, wherein the second GUI component further comprises a fifth GUI component, the fifth GUI component representing an indicator of an active controllable functionality amongst a list of indicators representing a plurality of controllable functionalities.

3. The virtual cockpit system of claim 2, wherein receiving the third control command causes the indicator to be updated so as to reflect a change in the active controllable functionality.

4. The virtual cockpit system of claim 1, wherein the second GUI component defines a modal view temporarily displayed on the display.

5. The virtual cockpit system of claim 1, wherein the controller comprises ride settings and focus controllers and wherein the first and third control commands are received further to the operator interacting with the ride settings.

6. The virtual cockpit system of claim 5, wherein the ride settings are configured to allow the operator to circle from the first controllable functionality to the second controllable functionality.

7. The virtual cockpit system of claim 5, wherein the focus controllers are configured to allow the operator to modify the first modifiable setting if the first controllable functionality is active or the second modifiable setting if the second controllable functionality is active.

8. The virtual cockpit system of claim 1, wherein the first and/or the second controllable functionality are customizable by the operator.

9. The virtual cockpit system of claim 1, wherein the first and/or the second controllable functionality are associated with a sub-system of the recreational vehicle or an accessory associated with the recreational vehicle.

10. The virtual cockpit system of claim 1, wherein updating the third GUI component by representing the second controllable functionality in replacement of the first controllable functionality defines cycling through a carousel of possible actions for the operator.

11. The virtual cockpit system of claim 1, wherein the second GUI component is located adjacent to the first GUI component, the first GUI component extending horizontally from a left side of the display to a right side of the display, the second GUI component extending vertically from a top of the display to a bottom of the display, a width of the first GUI component being greater than a length of the first GUI component, a width of the second GUI component being smaller than a length of the second GUI component.

12. The virtual cockpit system of claim 1, wherein the instructions, upon being executed by the processor, further cause displaying, on the display, a sixth GUI component representing a second set of information, the second set of information relating to infotainment functionalities associated with the recreational vehicle.

13. The virtual cockpit system of claim 12, wherein the second GUI component is located between the first GUI component and the sixth GUI component.

14. The virtual cockpit system of claim 1, wherein the first set of information comprises at least one of:
a vehicle speed of the recreational vehicle;
a fuel level of the recreational vehicle;
a battery state of charge of the recreational vehicle;
a range of the recreational vehicle; and
an engine speed of the recreational vehicle.

15. The virtual cockpit system of claim 1, wherein the first control command, the second control command, and the third control command are input to the controller via a single switch on a handlebar or steering wheel of the recreational vehicle.

16. The virtual cockpit system of claim 1, wherein the first controllable functionality is an engine mode functionality for varying a throttle response of an engine of the recreational vehicle, and wherein the second controllable functionality is a drive mode functionality.

17. A recreational vehicle comprising a virtual cockpit system for a recreational vehicle, the virtual cockpit system comprising a display, a controller and a processor, the display being configured for presenting information to an operator of the recreational vehicle, the controller being configured for allowing interactions between the operator and the virtual cockpit system, the processor being configured for executing instructions which upon being executed cause:

displaying, on the display, a first graphical user interface (GUI) component representing a first set of information, the first set of information relating to operating conditions of the recreational vehicle;

upon receiving, from the controller, a first control command, displaying, on the display, the first GUI component and a second GUI component comprising a third GUI component and a fourth GUI component, the third GUI component representing a first controllable functionality of the recreational vehicle corresponding to a first component of the recreational vehicle, the fourth GUI component representing a first modifiable setting of the first controllable functionality of the recreational vehicle;

upon receiving, from the controller, a second control command corresponding to the first modifiable setting, modifying a functionality of the first component of the recreational vehicle, thereby causing a modification of operational performance of the recreational vehicle; and upon receiving, from the controller, a third control command, updating the third GUI component by replacing the first controllable functionality of the recreational vehicle with a second controllable functionality of the recreational vehicle corresponding to a second component of the recreational vehicle that is different from the first component and updating the fourth GUI component by replacing the first modifiable setting of the first controllable functionality of the recreational vehicle with a second modifiable setting of the second controllable functionality of the recreational vehicle.

18. The recreational vehicle of claim 17, wherein the controller comprises ride settings and focus controllers;

wherein the first and third control commands are received further to the operator interacting with the ride settings; and further comprising a handlebar and the ride settings and the focus controllers are mounted on the handlebar.

19. The recreational vehicle of claim 17, wherein the controller comprises ride settings and focus controllers;

wherein the first and third control commands are received further to the operator interacting with the ride settings; and further comprising a steering wheel and the ride settings and the focus controllers are mounted on the steering wheel.

20. A computer-implemented method for presenting information to an operator of a recreational vehicle comprising:

displaying, on a display, a first graphical user interface (GUI) component representing a first set of information, the first set of information relating to operating conditions of the recreational vehicle;

upon receiving, from a controller, a first control command, displaying, on the display, the first GUI component and a second GUI component comprising a third GUI component and a fourth GUI component, the third GUI component representing a first controllable functionality of the recreational vehicle corresponding to a first component of the recreational vehicle, the fourth GUI component representing a first modifiable setting of the first controllable functionality of the recreational vehicle;

upon receiving, from the controller, a second control command corresponding to the first modifiable setting, modifying a functionality of the first component of the recreational vehicle, thereby causing a modification of operational performance of the recreational vehicle; and upon receiving, from the controller, a third control command, updating the third GUI component by replacing the first controllable functionality of the recreational vehicle with a second controllable functionality of the recreational vehicle corresponding to a second component of the recreational vehicle that is different from the first component and updating the fourth GUI component by replacing the first modifiable setting of the first controllable functionality of the recreational vehicle a second modifiable setting of the second controllable functionality of the recreational vehicle.

* * * * *